United States Patent
Kibune

(10) Patent No.: US 11,875,068 B2
(45) Date of Patent: Jan. 16, 2024

(54) PRINTING METHOD, SERVER, AND PRINTING SYSTEM

(71) Applicant: SEIKO EPSON CORPORATION, Tokyo (JP)

(72) Inventor: Shusuke Kibune, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/190,373

(22) Filed: Mar. 27, 2023

(65) Prior Publication Data

US 2023/0305764 A1 Sep. 28, 2023

(30) Foreign Application Priority Data

Mar. 28, 2022 (JP) ................................. 2022-051812

(51) Int. Cl.
*G06F 3/12* (2006.01)

(52) U.S. Cl.
CPC .......... *G06F 3/1208* (2013.01); *G06F 3/1256* (2013.01); *G06F 3/129* (2013.01)

(58) Field of Classification Search
CPC .............. H04N 1/6013; H04N 1/00045; G06F 3/1208; G06F 3/1256; G06F 3/129; G01N 21/251
See application file for complete search history.

(56) References Cited

U.S. PATENT DOCUMENTS

| | | | | |
|---|---|---|---|---|
| 5,781,709 A | * | 7/1998 | Usami | G06K 15/02 358/1.9 |
| 2009/0147279 A1 | * | 6/2009 | Ming | H04N 1/6055 358/1.9 |
| 2011/0304866 A1 | * | 12/2011 | Sawada | G06F 3/1288 358/1.9 |
| 2020/0285424 A1 | * | 9/2020 | Matsuzaka | G06F 3/1208 |

FOREIGN PATENT DOCUMENTS

JP H09-116767 A 5/1997

* cited by examiner

*Primary Examiner* — Iriana Cruz
(74) *Attorney, Agent, or Firm* — WORKMAN NYDEGGER

(57) ABSTRACT

A printing method includes a first printing setting information receiving step for receiving first printing setting information for simulating printing by a second printing unit, a first printing instructing step for instructing a first printing unit to print first printing data based on the first printing setting information, a transmitting step for transmitting, to a second information supplying unit, second printing data based on the first printing data and second printing setting information based on a colorimetric result, a receiving step for receiving the second printing data and the second printing setting information, a second printing setting information receiving step for receiving the second printing data and the second printing setting information from the second information supplying unit, a second printing instructing step for instructing the second printing unit to print the second printing data based on the second printing setting information.

13 Claims, 16 Drawing Sheets

FIG. 15

COLOR SETTING ☒

INPUT　　OUTPUT

☐ PRIORITIZE EMBEDDED PROFILE

▼ CMYK

PROFILE :
[ ○○○○○ ▼ ]

RENDERING INTENT :
[ MAINTAIN RELATIVE COLOR GAMUT ▼ ]

☑ BLACK POINT CORRECTION
☐ PURE BLACK
☐ INK PLATE RETAINING
☐ CMYK PURE COLOR RETAINING

▼ RGB

PROFILE :
[ ○○○○○ ▼ ]

RENDERING INTENT :
[ PERCEPTUAL ▼ ]

☐ BLACK POINT CORRECTION
☐ PURE BLACK

▼ COLOR SIMULATION

PROFILE :
[ NO DESIGNATION ▼ ]

CMYK DEVICE LINK PROFILE :
[ NO DESIGNATION ▼ ]

U20

---

U2

- JOB INFORMATION
- BASIC SETTING
- LAYOUT SETTING
- COLOR SETTING
- COLOR SUBSTITUTION
- MARK SETTING
- CLIP
- DIVIDED PRINTING

FIG. 16

COLOR SETTING

INPUT — OUTPUT

☐ PRIORITIZE EMBEDDED PROFILE

▼ CMYK

PROFILE:
[ ○○○○○ ▼ ]

RENDERING INTENT:
[ MAINTAIN RELATIVE COLOR GAMUT ▼ ]

☑ BLACK POINT CORRECTION
☐ PURE BLACK
☐ INK PLATE RETAINING
☐ CMYK PURE COLOR RETAINING

▼ RGB

PROFILE:
[ ○○○○○ ▼ ]

RENDERING INTENT:
[ PERCEPTUAL ▼ ]

☐ BLACK POINT CORRECTION
☐ PURE BLACK

▼ COLOR SIMULATION

PROFILE:
[ NO DESIGNATION ▼ ]

CMYK DEVICE LINK PROFILE:
[ NO DESIGNATION ▼ ]

☑ PATCH PRINTING    [ DETAIL SETTING ]

- JOB INFORMATION
- BASIC SETTING
- LAYOUT SETTING
- COLOR SETTING
- COLOR SUBSTITUTION
- MARK SETTING
- CLIP
- DIVIDED PRINTING

— U3
— U30
— U31

PRINTING METHOD, SERVER, AND PRINTING SYSTEM

The present application is based on, and claims priority from JP Application Serial Number 2022-051812, filed Mar. 28, 2022, the disclosure of which is hereby incorporated by reference herein in its entirety.

BACKGROUND

1. Technical Field

The present disclosure relates to a printing method, a server, and a printing system.

2. Related Art

There has been known a method of creating a proof in order to check the quality of a print before printing (JP-A-9-116767 (Patent Literature 1)).

In the method described in Patent Literature 1, data for proofreading is printed using a dedicated machine for creating a proof and printing is executed using a mass-production machine. In the method described in Patent Literature 1, spot check for a print and trial and error for color adjustment have been necessary.

SUMMARY

An aspect of the present disclosure is a printing method including: a first printing setting information receiving step in which a first information processing unit receives, from a first information supplying unit, first printing setting information for simulating printing to be executed by a second printing unit; a first printing instructing step in which the first information processing unit instructs a first printing unit different from the second printing unit to print first printing data based on the first printing setting information received in the first printing setting information receiving step; a first printing step in which the first printing unit executes, according to the instruction from the first information processing unit in the first printing instructing step, the printing of the first printing data based on the first printing setting information; a transmitting step in which the first information processing unit transmits, to a second information supplying unit, second printing data based on the first printing data used for the execution of the printing by the first printing unit in the first printing step and second printing setting information based on a colorimetric result concerning the first printing data; a receiving step in which the second information supplying unit receives, from the first information processing unit, the second printing data and the second printing setting information transmitted in the transmitting step; a second printing setting information receiving step in which a second information processing unit receives, from the second information supplying unit, the second printing data and the second printing setting information received in the receiving step; a second printing instructing step in which the second information processing unit instructs the second printing unit to print the second printing data based on the second printing setting information received in the second printing setting information receiving step; and a second printing step in which the second printing unit executes, according to the instruction from the second information processing unit in the second printing instructing step, the printing of the second printing data based on the second printing setting information.

An aspect of the present disclosure is a server that: transmits, to a first information processing unit, first printing setting information for simulating printing to be executed by a second printing unit; receives, from the first information processing unit, second printing data based on first printing data used for execution of printing by a first printing unit different from the second printing unit according to an instruction to print the first printing data based on the first printing setting information received from the first information processing unit and second printing setting information based on a colorimetric result concerning the first printing data; and transmits, to a second information processing unit that instructs the second printing unit to print the second printing data based on the second printing setting information, the second printing data and the second printing setting information received from the first information processing unit.

An aspect of the present disclosure is a printing system including a first information processing unit, a first printing unit, a second information processing unit, a second printing unit different from the first printing unit, a first information supplying unit, and a second information supplying unit. The first information processing unit includes: a first receiving unit configured to receive, from the first information supplying unit, first printing setting information for simulating printing to be executed by the second printing unit; a first printing instructing unit configured to instruct the first printing unit to print first printing data based on the first printing setting information received by the first receiving unit; and a first transmitting unit configured to transmit, to the second information supplying unit, second printing data based on the first printing data used for the execution of the printing by the first printing unit according to the instruction from the first printing instructing unit and second printing setting information based on a colorimetric result concerning the first printing data. The first printing unit executes, according to the instruction from the first printing instructing unit, the printing of the first printing data based on the first printing setting information. The second information supplying unit receives, from the first information processing unit, the second printing data and the second printing setting information transmitted by the first transmitting unit. The second information processing unit includes: a second receiving unit configured to receive, from the second information supplying unit, the second printing data and the second printing setting information received by the second information supplying unit; and a second printing instructing unit configured to instruct the second printing unit to print the second printing data based on the second printing setting information received by the second receiving unit. The second printing unit executes, according to the instruction from the second printing instructing unit, the printing of the second printing data based on the second printing setting information.

An aspect of the present disclosure is a non-transitory computer-readable storage medium storing a program for causing a computer to execute: a first printing setting information transmitting step for transmitting, to a first information processing unit, first printing setting information for simulating printing to be executed by a second printing unit; a receiving step for receiving, from the first information processing unit, second printing data based on first printing data used for execution of printing by a first printing unit different from the second printing unit according to an instruction to print the first printing data based on the first printing setting information received from the first information processing unit and second printing setting information based on a colorimetric result concerning the first printing data; and a transmitting step for transmitting, to a second information processing unit that instructs the second printing unit to print the second printing data based on the second printing setting information, the second printing data and the second printing setting information received from the first information processing unit.

BRIEF DESCRIPTION OF THE DRAWINGS

FIG. 15 is a diagram showing an example of a proof mode dedicated screen according to the embodiments of the present disclosure.

FIG. 16 is a diagram showing an example of a proof mode dedicated setting item including an item for selecting printing of a colorimetric patch according to the embodiments of the present disclosure.

DESCRIPTION OF EXEMPLARY EMBODIMENTS

Figure 1:
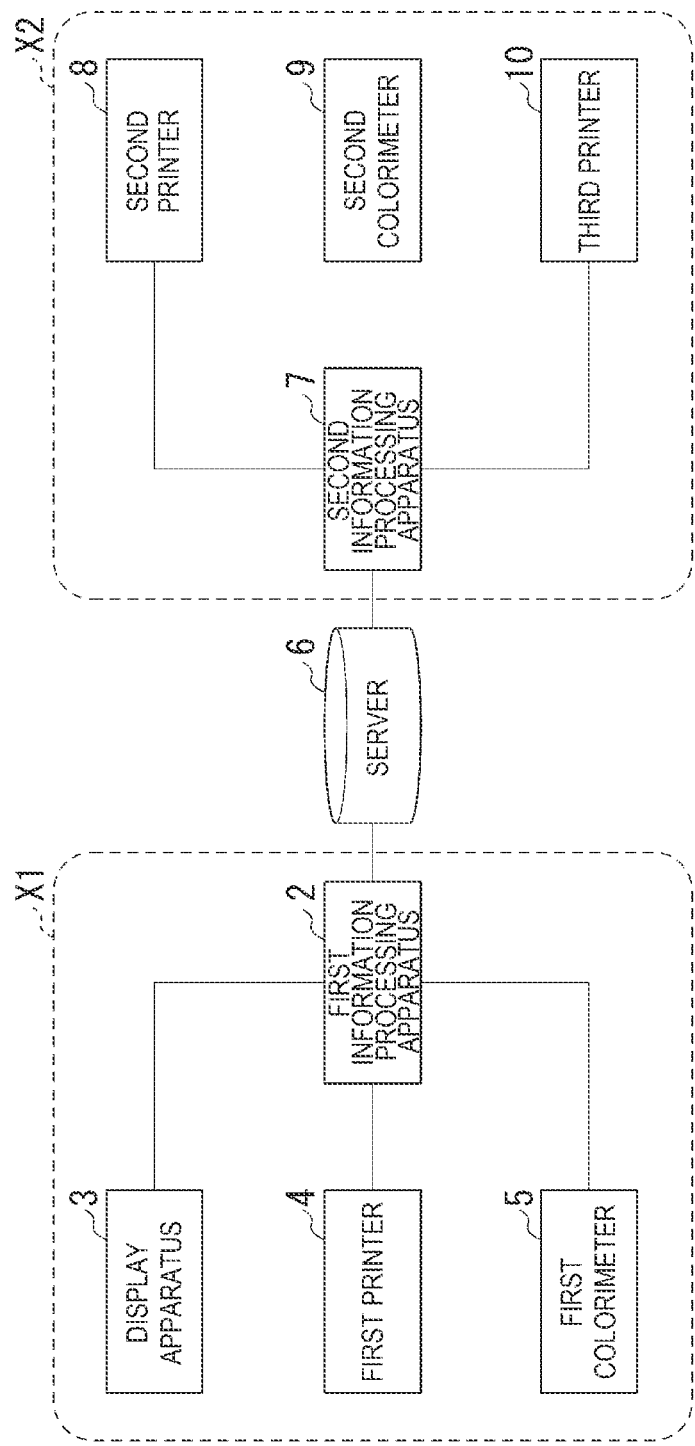
FIG. 1 is a diagram showing an example of a configuration of a printing system according to a first embodiment of the present disclosure.

A first embodiment of the present disclosure is explained in detail below with reference to the drawings. FIG. 1 is a diagram showing an example of a configuration of a printing system 1 according to this embodiment. The printing system 1 includes a first information processing apparatus 2, a display apparatus 3, a first printer 4, a first colorimeter 5, a server 6, a second information processing apparatus 7, a second printer 8, a second colorimeter 9, and a third printer 10.

The first information processing apparatus 2, the display apparatus 3, the first printer 4, and the first colorimeter 5 are included in a designer environment X1 in the printing system 1. The designer environment X1 is an environment used by a designer who designs a print. The designer environment X1 is, for example, an office of the designer.

The first information processing apparatus 2 performs various kinds of information processing. The information processing includes processing for causing the first printer 4 to execute printing and processing for causing the display apparatus 3 to display various images or screens. The first information processing apparatus 2 is, for example, a personal computer (PC).

The display apparatus 3 displays an image based on printing data and various operation screens. The display apparatus 3 is, for example, a liquid crystal display or an organic electro-luminescence (EL) display.

The first printer 4 executes printing of first printing data. The first printing data is data of an image designed by the designer according to a demand of a client. The first printer 4 is used for proof work. In the proof work, finish of a print on which the first printing data is printed is checked by the designer. The first printer 4 is referred to as proofer as well. The first printer 4 has a wider color gamut than the second printer 8.

The first colorimeter 5 performs colorimetry. As an example, the first colorimeter 5 performs colorimetry with spectral colorimetry. The first colorimeter 5 is used for colorimetry for a print printed by the first printer 4.

The first information processing apparatus 2 and the display apparatus 3 are capable of communicating. The first information processing apparatus 2 and the first printer 4 are capable of communicating. The first information processing apparatus 2 and the first colorimeter 5 are capable of communicating. The communication between the first information processing apparatus 2 and the display apparatus 3, the communication between the first information processing apparatus 2 and the first printer 4, and the communication between the first information processing apparatus 2 and the first colorimeter 5 are respectively wireless communication or wired communication. The wireless communication is communication via short-range radio or a wireless LAN (Local Area Network).

The server 6 performs various kinds of information processing. As an example, the server 6 is a Cloud server. That is, the server 6 is configured from one or a plurality of virtual servers. The first information supplying unit and the second information supplying unit are included in such a virtual server. The server 6 may be one server or may be configured from a plurality of servers.

The first information processing apparatus 2, the server 6, and the second information processing apparatus 7 are communicably connected to one another via a wireless network. As an example, the first information processing apparatus 2 and the server 6 perform communication via a wireless LAN. As an example, the second information processing apparatus 7 and the server 6 perform communication via a wireless LAN.

The second information processing apparatus 7, the second printer 8, the second colorimeter 9, and the third printer 10 are included in a producer environment X2 in the printing system 1. The producer environment X2 is an environment used by a producer who produces a print. The producer environment X2 is a production site of a producer such as a printing factory. Producing a plurality of prints is also referred to mass-producing the print.

The second information processing apparatus 7 performs various kinds of information processing. The information processing includes processing for causing the second printer 8 to execute printing and processing for causing the third printer 10 to execute printing. The second information processing apparatus 7 is, for example, a PC.

The second printer 8 executes printing of second printing data. The second printing data is printing data for which adjustment of colors included in the first printing data is performed by the designer. That is, the second printing data is printing data based on the first printing data. The second printer 8 is used to mass-produce prints. The second printer 8 is referred to as mass-production machine as well.

The second colorimeter 9 performs colorimetry. As an example, the second colorimeter 9 performs colorimetry by spectral colorimetry. The second colorimeter 9 is used for colorimetry of a print printed by the second printer 8.

The third printer 10 executes printing of the second printing data. The third printer 10 is used by the producer and the client to check finish of a print on which the second printing data is printed.

The second information processing apparatus 7 and the second printer 8 are capable of communicating. The second information processing apparatus 7 and the second colorimeter 9 are capable of communicating. The second information processing apparatus 7 and the third printer 10 are capable of communicating. The communication between the second information processing apparatus 7 and the second printer 8, the communication between the second information processing apparatus 7 and the second colorimeter 9, and the communication between the second information processing apparatus 7 and the third printer 10 are respectively wireless communication or wired communication. The wireless communication is, for example, communication via short-range radio or a wireless LAN.

Figure 2:
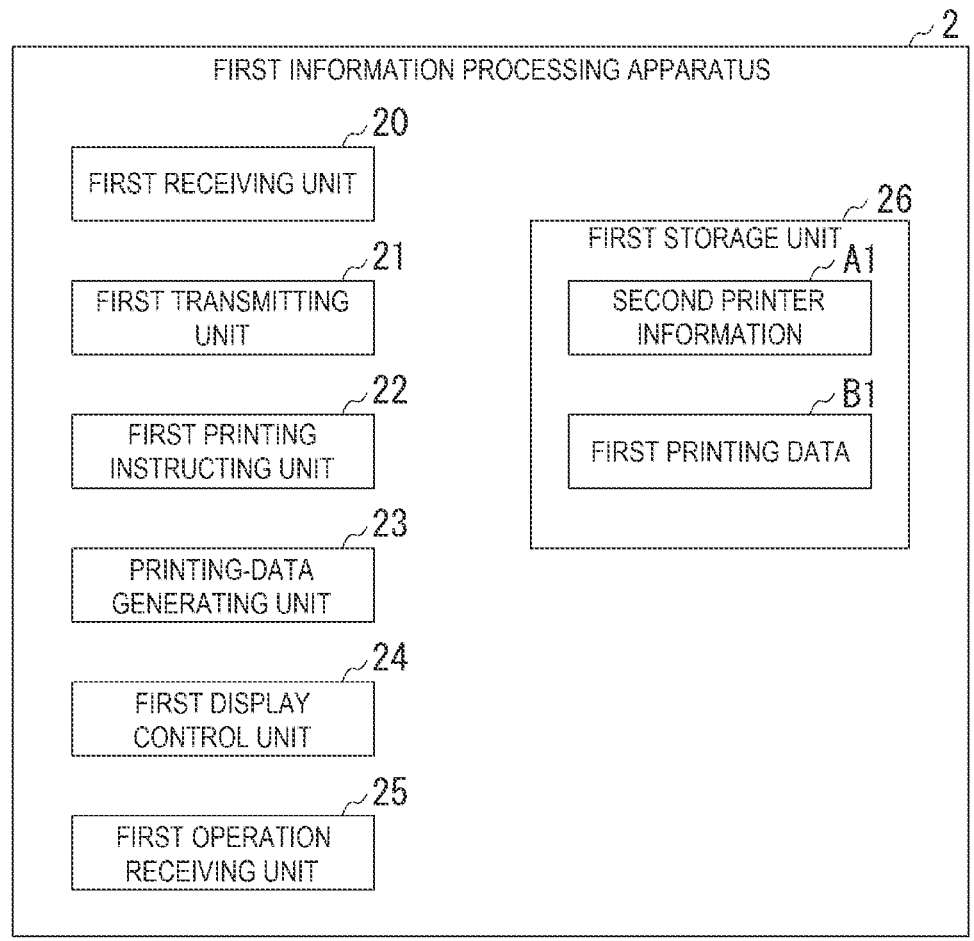
FIG. 2 is a diagram showing an example of a functional configuration of a first information processing apparatus according to the first embodiment of the present disclosure.

FIG. 2 is a diagram showing an example of a functional configuration of the first information processing apparatus 2 according to this embodiment. The first information processing apparatus 2 includes a first receiving unit 20, a first transmitting unit 21, a first printing instructing unit 22, a printing-data generating unit 23, a first display control unit 24, a first operation receiving unit 25, and a first storage unit 26. The first receiving unit 20, the first transmitting unit 21, the first printing instructing unit 22, the printing-data generating unit 23, the first display control unit 24, and the first operation receiving unit 25 are realized by a CPU (Central Processing Unit) reading a program from a ROM (Read Only Memory) and executing processing.

The first receiving unit 20 receives various kinds of information. The first receiving unit 20 includes a communication interface.

The first transmitting unit 21 transmits various kinds of information. The first transmitting unit 21 includes a communication interface.

The first printing instructing unit 22 instructs the first printer 4 to print first printing data B1 based on printing setting information. The printing setting information is second printer information A1 explained below. The first printing instructing unit 22 includes a printing application and a first printer driver.

The printing-data generating unit 23 generates the first printing data B1. The printing-data generating unit 23 adjusts colors included in the first printing data B1. The printing-data generating unit 23 performs generation of the first printing data B1 and adjustment of the colors based on operation from the designer. The printing-data generating unit 23 includes a design application AP1.

The first display control unit 24 causes the display apparatus 3 to display various images.

The first operation receiving unit 25 receives various kinds of operation by the designer. The operation is performed via, for example, a mouse, a keyboard, or a touch panel.

The first storage unit 26 stores various kinds of information. The first storage unit 26 includes a storage device such as a magnetic hard disk device or a semiconductor storage device. The first storage unit 26 stores, for example, the second printer information A1 and the first printing data B1. The second printer information A1 is printing setting information for simulating printing to be executed by the second printer 8. The second printer information A1 is an example of first printing setting information.

Figure 3:
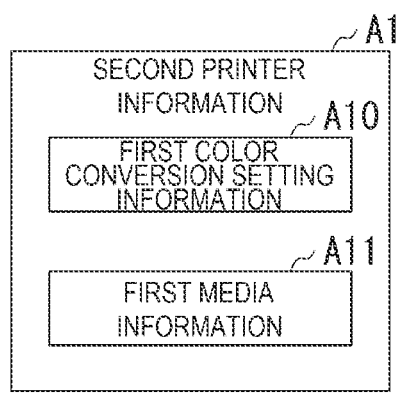
FIG. 3 a diagram showing an example of a configuration of second printer information according to the first embodiment of the present disclosure.

The second printer information A1 is explained with reference to FIG. 3. FIG. 3 is a diagram showing an example of a configuration of the second printer information A1 according to this embodiment. The second printer information A1 includes first color conversion setting information A10 and first media information A11.

The first color conversion setting information A10 includes a media profile and various parameters for printing. The media profile is a color profile for converting an input value of a color into an output value. The color profile is, for example, a table in which the input value of the color and the output value are associated. The media profile may include a device link profile. The media profile is used when printing data is output to a printer. The media profile is referred to as output profile as well.

The input value of the color is represented by a predetermined color value. The input value of the color is, for example, an Lab value. The input value of the color may be represented by another color value such as an RGB value.

The output value of the color is represented by a predetermined color representation method. The output value of the color is, for example, a value represented by a CMYK color model. The value represented by the CMYK color model is referred to as CMYK value as well. The output value of the color may be represented by another color model.

The various parameters for printing include, for example, a parameter for selecting black point correction and a parameter for selecting an output of pure black.

The first media information A11 indicates a printing mode, a type of paper on which printing is performed, and the like. The printing mode includes setting of printing speed. The type of paper includes a size and quality.

Figure 4:
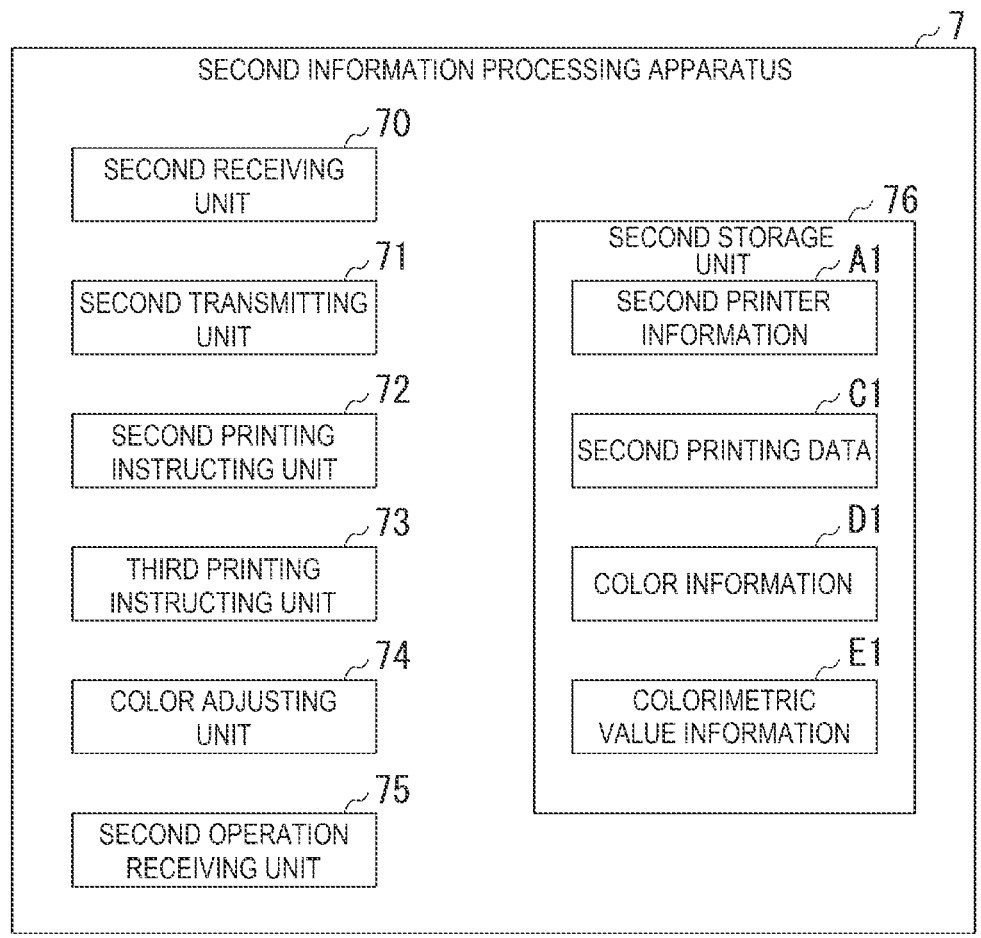
FIG. 4 is a diagram showing an example of a functional configuration of a second information processing apparatus according to the first embodiment of the present disclosure.

FIG. 4 is a diagram showing an example of a functional configuration of the second information printing apparatus 7 according to this embodiment. The second information processing apparatus 7 includes a second receiving unit 70, a second transmitting unit 71, a second printing instructing unit 72, a third printing instructing unit 73, a color adjusting unit 74, a second operation receiving unit 75, and a second storage unit 76. The second receiving unit 70, the second transmitting unit 71, the second printing instructing unit 72, the third printing instructing unit 73, the color adjusting unit 74, and the second operation receiving unit 75 are realized by a CPU reading a program from a ROM and executing processing.

The second receiving unit 70 receives various kinds of information. The second receiving unit 70 includes a communication interface.

The second transmitting unit 71 transmits various kinds of information. The second transmitting unit 71 includes a communication interface.

The second printing instructing unit 72 instructs the second printer 8 to print printing data based on printing setting information. The printing setting information is color information D1 explained below. The second printing instructing unit 72 includes a printing application and a second printer driver PD2.

The third printing instructing unit 73 instructs the third printer 10 to print printing data based on printing setting information. The printing setting information is the color information D1 explained below. The third printing instructing unit 73 includes a printing application and a third printer driver.

The color adjusting unit 74 adjusts colors included in the color information D1. The color adjusting unit 74 performs the adjustment of the colors based on operation from the producer. The color adjusting unit 74 includes a color adjustment application.

The second operation receiving unit 75 receives various kinds of operation by the producer. The operation is performed via, for example, a mouse, a keyboard, or a touch panel.

The second storage unit 76 stores various kinds of information. The second storage unit 76 includes a storage device such as a magnetic hard disk device or a semiconductor storage device. The second storage unit 76 stores, for example, the second printer information A1, the color information D1, colorimetric value information E1, and the first printing data B1.

The color information D1 is generated by the first information processing apparatus 2 based on proof work by the designer. The proof work includes colorimetry by the first colorimeter 5. The first colorimeter 5 performs colorimetry for the first printing data B1. Therefore, the color information D1 is printing setting information based on a colorimetric result based on the first printing data B1 by the first colorimeter 5.

The colorimetric value information E1 indicates a value obtained by colorimetry by the first colorimeter 5 for colors included in a print on which the first printing data B1 is printed in the proof work.

Figure 5:
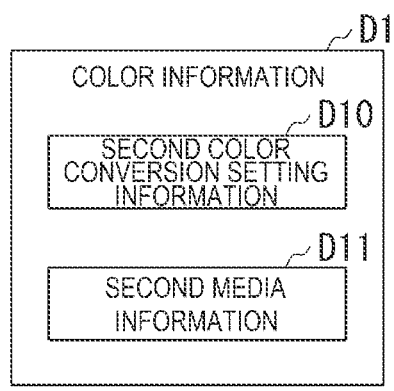
FIG. 5 is a diagram showing an example of a configuration of color information according to the first embodiment of the present disclosure.

A configuration of the color information D1 is explained with reference to FIG. 5. FIG. 5 is a diagram showing an example of a configuration of the color information D1 according to this embodiment. The color information D1 includes second color conversion setting information D10 and second media information D11.

The second color conversion setting information D10 includes a media profile and various parameters for printing.

The second media information D11 indicates a printing mode, a type of paper on which printing is performed, and the like.

Figure 6:
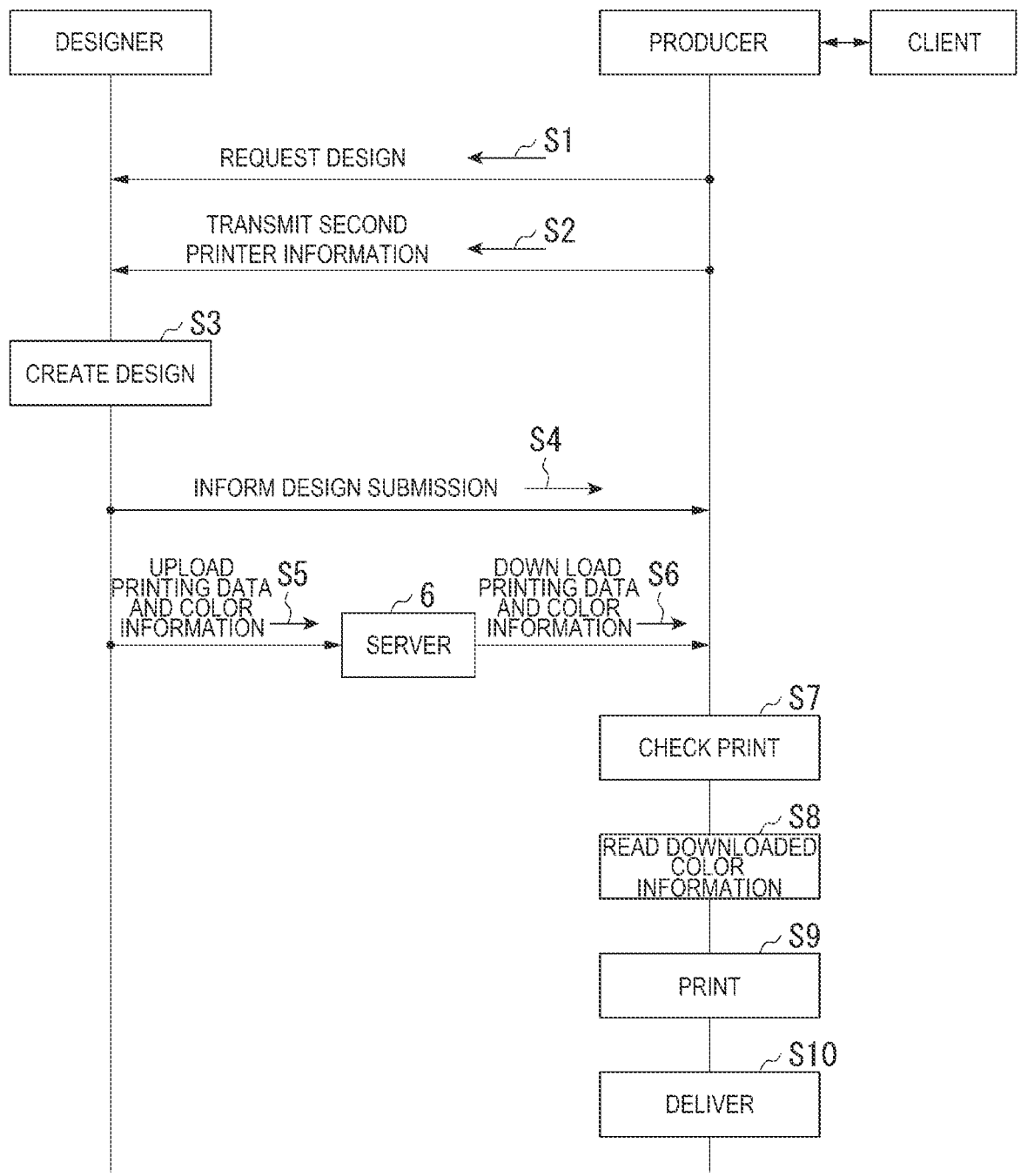
FIG. 6 is a diagram showing an example of an overview of a printing method according to the first embodiment of the present disclosure.

Subsequently, an overview of a printing method including proof work in the printing system 1 is explained with reference to FIG. 6. FIG. 6 is a diagram showing an example of an overview of a printing method according to this embodiment. In this embodiment, as an example, a model of the second printer 8 used by the producer for mass-production of prints is determined in advance.

Step S1: The producer requests design to the designer. The producer performs the request according to a request from the client.

Step S2: The producer provides the second printer information A1 to the designer. It is determined in advance between the producer and the client that the second printer 8 is used for mass-production of prints.

Step S3: The designer creates design. When creating the design, the designer performs proof work using the first information processing apparatus 2. The first information processing apparatus 2 causes the first printer 4 to execute, based on the second printer information A1 provided from the producer, printing to reproduce a color printed by the second printer 8. The designer performs the proof work while checking a print on which the color printed by the second printer 8 is reproduced.

Step S4: The designer informs the producer of design submission. That is, the designer informs that design is completed.

Step S5: The designer uploads second printing data C1 and the color information D1 to the server 6.

Step S6: The producer downloads the second printing data C1 and the color information D1 from the server 6.

Step S7: The producer checks a print designed by the designer. The producer causes the third printer 10 to print the second printing data C1 based on the downloaded color information D1. The producer confirms a print on which the second printing data C1 is printed as the print designed by the designer.

Step S8: The producer causes a printing application to read the downloaded color information D1. The printing application is installed in the second information processing apparatus 7.

Step S9: The producer prints the second printing data C1 with the second printer 8. The second printer 8 performs the printing based on the color information D1.

Step S10: The producer delivers the print printed by the second printer 8 to the client.

Then, the printing system 1 ends the printing method.

As explained below, in this embodiment, the first printing data B1 is printed by the first printer 4 and the proof work is performed by the designer based on a printing result of the first printing data B1. The first printing data B1 is processed and the second printing data C1 is generated in a process of the proof work by the designer. The generated second printing data C1 is transmitted to the second information processing apparatus 7 via the server 6. The second printing data C1 is printed by the second printer 8. The color information D1 is transmitted from the first information processing apparatus 2 to the second information processing apparatus 7 via the server 6. The color information D1 is generated based on the colorimetric result concerning the first printing data B1.

Figure 7:
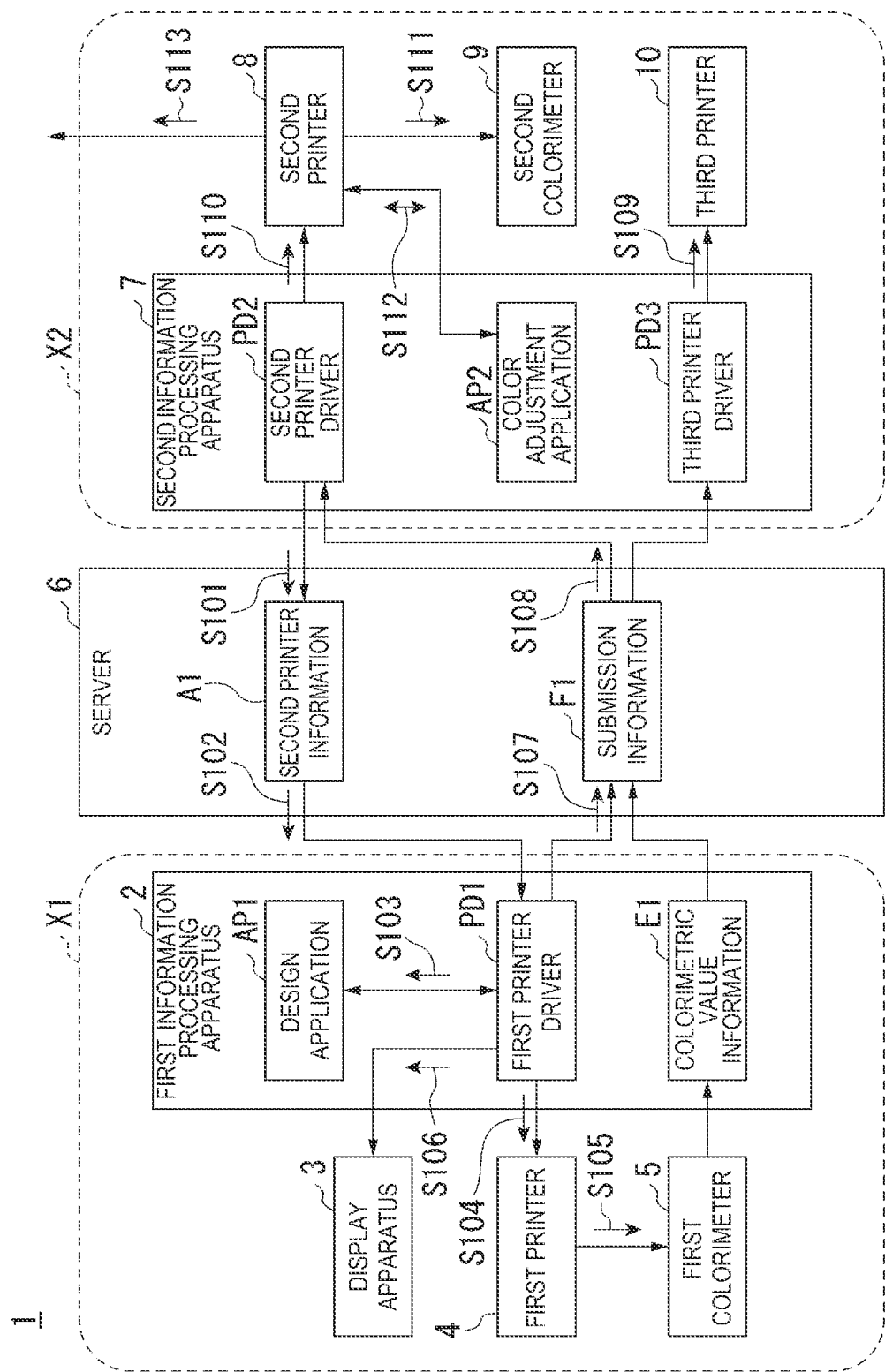
FIG. 7 is a diagram showing an example of details of the printing method according to the first embodiment of the present disclosure.

FIG. 7 is a diagram showing an example of details of the printing method according to this embodiment.

Step S101: The second transmitting unit 71 transmits the second printer information A1 to the server 6. When the second operation receiving unit 75 receives operation for transmitting the second printer information A1 to the server 6, the second transmitting unit 71 executes transmission of the second printer information A1. The second transmitting unit 71 reads out the second printer information A1 from the second storage unit 76 and transmits the read-out second printer information A1. The server 6 receives the second printer information A1 from the second information processing apparatus 7. The server 6 may notify the first information processing apparatus 2 that the second printer information A1 is received.

Thereafter, the first information processing apparatus 2 executes processing in step S102.

The second printer information A1 may be stored in the server 6 in advance. In that case, the processing in step S101 is omitted.

Step S102: The first receiving unit 20 receives the second printer information A1 from the server 6. When the first operation receiving unit 25 receives operation for receiving the second printer information A1 from the server 6, the first receiving unit 20 transmits, to the server 6, a signal for requesting the server 6 to transmit the second printer information A1. When receiving the signal, the server 6 transmits the second printer information A1 to the first information processing apparatus 2.

When acquiring the second printer information A1 from the second information processing apparatus 7, the server 6 may transmit the acquired second printer information A1 to the first information processing apparatus 2 in a predetermined period. The predetermined period is, for example, a period immediately after the server 6 acquires the second printer information A1.

The first receiving unit 20 causes the first storage unit 26 to store the received second printer information A1. A first printer driver PD1 reads the second printer information A1 from the first storage unit 26.

Thereafter, the first information processing apparatus 2 executes processing in step S103.

As explained above, the second printer information A1 is printing setting information used for printing by the second printer 8. Therefore, the first information processing apparatus 2 receives first printing setting information including the printing setting information used for printing by the second printer 8.

Step S103: The printing-data generating unit 23 generates the first printing data B1. The printing-data generating unit 23 corrects colors included in the first printing data B1. When the first operation receiving unit 25 receives operation for generating the first printing data B1, the printing-data generating unit 23 executes the generation of the first printing data B1. When the first operation receiving unit 25 receives operation for correcting the colors included in the first printing data B1, the printing-data generating unit 23 corrects the colors included in the first printing data B1. The operation for generating the first printing data B1 and the operation for correcting the colors included in the first printing data B1 are operation of the designer for creating and correcting design using the design application AP1.

Thereafter, the first information processing apparatus 2 executes processing in step S104.

Step S104: The first printing instructing unit 22 causes the first printer 4 to execute printing of the first printing data B1. That is, the first printing instructing unit 22 causes the first printer 4 to print a proof. The first printing instructing unit 22 instructs, based on the second printer information A1 received by the first receiving unit 20, the first printer 4 to print the first printing data B1. The instruction is transmitted from the first printer driver PD1 to the first printer 4.

The first printing instructing unit 22 causes the first printer 4 to simulate printing to be executed by the second printer 8 and execute printing of the first printing data B1 based on the second printer information A1. The first printer 4 executes, according to the instruction from the first printing instructing unit 22, the printing of the first printing data B1 based on the second printer information A1.

When causing the first printer 4 to execute the printing of the first printing data B1, the first printing instructing unit 22 causes the first printer 4 to print a colorimetric patch together with the first printing data B1. The colorimetric patch may not be printed. That is, the first printer 4 may print only the first printing data B1.

Thereafter, the first information processing apparatus 2 executes processing in step S105.

Figure 8:
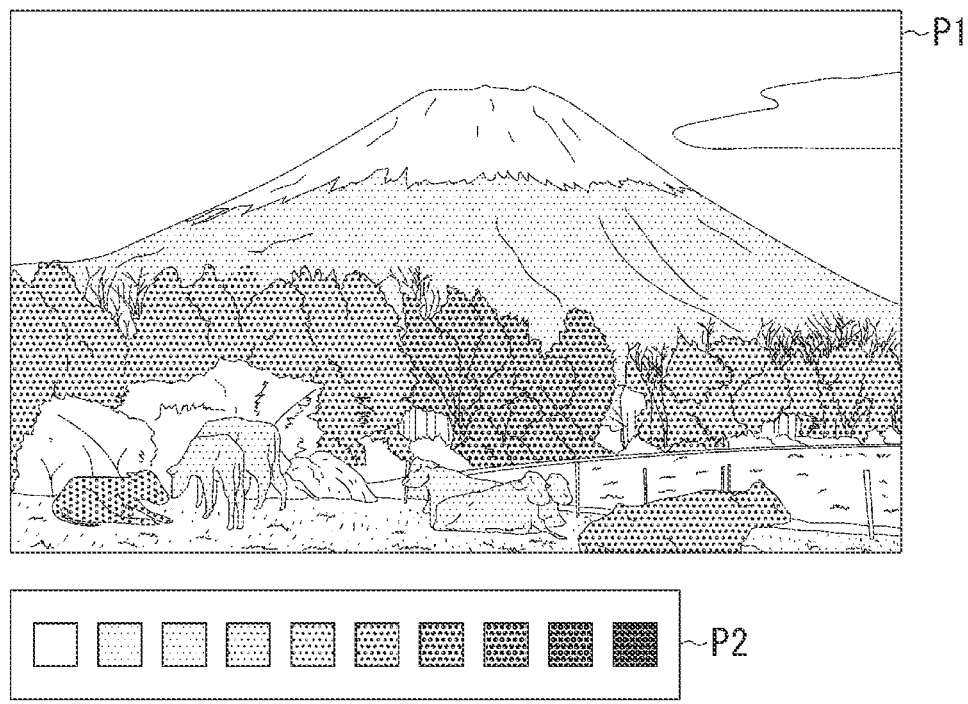
FIG. 8 is a diagram showing an example of a proof on which a colorimetric patch is printed according to the first embodiment of the present disclosure.

FIG. 8 shows an example of a proof on which a colorimetric patch is printed. In FIG. 8, a colorimetric patch P2 is printed on a proof P1. The designer corrects the first printing data B1 while checking the proof P1 or an image of the first printing data B1 displayed on the display apparatus 3. The correcting the first printing data B1 means, for example, changing an input color included in the first printing data B1.

The designer changes the media profile included in the first color conversion setting information A10 while checking the proof P1.

Referring back to FIG. 7, the explanation of the printing method is continued.

Step S105: The first colorimeter 5 performs colorimetry for a specific color included in the proof. The specific color for which the colorimetry is performed is selected by the designer. The first colorimeter 5 transmits a value obtained by the colorimetry to the first information processing apparatus 2 as the colorimetric value information E1.

Thereafter, the first information processing apparatus 2 executes processing in step S106.

Step S106: The first display control unit 24 causes the display apparatus 3 to display an image of the first printing data B1. The image of the first printing data B1 is referred to as proof image as well. The proof image displayed on the display apparatus 3 is checked by the designer and proof work is performed.

Thereafter, the first information processing apparatus 2 executes processing in step S107.

The respective kinds of processing in steps S103, S104, S105, and S106 may be repeatedly executed based on determination of the designer while the designer checks any one or more of the proof, the proof image, and the colorimetric result by the first colorimeter 5. The order of the execution of steps S104 and S106 may be opposite.

The proof work may be performed with the processing in step S106 omitted. When the processing in step S106 is omitted, the display apparatus 3 may be omitted from the configuration of the printing system 1.

As a result of the proof work, the second printing data C1 is generated by the printing-data generating unit 23 based on the first printing data B1. The first printing data B1 is the printing data used for the execution of the printing by the first printer 4. Therefore, the second printing data C1 is printing data based on the first printing data B1 used for the execution of the printing by the first printer 4. In the second printing data C1, for example, the input color included in the first printing data B1 is changed. When the first printing data B1 is not changed, the second printing data C1 and the first printing data B1 are the same. As a result of the proof work, the color information D1 is generated by the printing-data generating unit 23.

Step S107: The first transmitting unit 21 transmits submission information F1 to the server 6. The submission information F1 includes the second printing data C1, the color information D1, and the colorimetric value information E1. Therefore, the first transmitting unit 21 transmits the second printing data C1, the color information D1, and the colorimetric value information E1 to the server 6. The submission information F1 may not include the colorimetric value information E1.

The server 6 receives the submission information F1 from the first information processing apparatus 2. That is, the server 6 receives the second printing data C1, the color information D1, and the colorimetric value information E1 from the first information processing apparatus 2. The server 6 may notify the second information processing apparatus 7 that the submission information F1 is received.

Thereafter, the server 6 executes processing in step S108.

In this embodiment, as an example, the color information D1 is second printing setting information generated by performing the proof work based on the result of performing the colorimetry for the colorimetric patch printed together with the first printing data B1. Therefore, the first transmitting unit 21 transmits, to the server 6, the second printing data C1 and the second printing setting information based on the result of performing the colorimetry for the colorimetric patch printed together with the first printing data B1.

Step S108: The server 6 transmits the submission information F1 to the second information processing apparatus 7. When receiving, from the second information processing apparatus 7, a signal for requesting transmission of the submission information F1, the server 6 transmits the submission information F1 to the second information processing apparatus 7. When acquiring the submission information F1 from the first information processing apparatus 2, the server 6 may transmit the acquired submission information F1 to the second information processing apparatus 7 in a predetermined period. The predetermined period is, for example, a period immediately after the server 6 acquire the submission information F1.

The second receiving unit 70 receives the submission information F1 from the server 6. That is, the second receiving unit 70 receives the second printing data C1, the color information D1, and the colorimetric value information E1 from the server 6. The second receiving unit 70 causes the second storage unit 76 to store the received second printing data C1 and the received color information D1. The second printer driver PD2 reads the second printing data C1 and the color information D1 from the second storage unit 76. A third printer driver PD3 reads the second printing data C1 and the color information D1 from the second storage unit 76.

Thereafter, the second information processing apparatus 7 executes processing in step S109.

Step S109: The third printing instructing unit 73 causes the third printer 10 to execute printing of the second printing data C1. The third printing instructing unit 73 instructs the third printer 10 to print the second printing data C1 based on the color information D1. The producer checks a print on which the second printing data C1 is printed to thereby checks design by the designer. The producer may refer to the colorimetric value indicated by the colorimetric value information E1.

Thereafter, the second information processing apparatus 7 executes processing in step S110.

Step S110: The second printing instructing unit 72 causes the second printer 8 to execute printing of the second printing data C1. The second printing instructing unit 72 instructs the second printer 8 to print the second printing data C1 based on the color information D1 received by the second receiving unit 70. The second printer 8 executes, according to the instruction from the second printing instructing unit 72, the printing of the second printing data C1 based on the color information D1. That is, prints on which the second printing data C1 is printed are mass-produced.

Thereafter, the third printer 10 executes processing in step S111.

Step S111: The second colorimeter 9 performs colorimetry for a specific color included in a print on which the second printing data C1 is printed by the second printer 8. The specific color for which the colorimetry is performed is, for example, a color, a result of colorimetry for which is included in the colorimetric value information E1. The producer performs inspection of the print by comparing a value obtained by the colorimetry by the second colorimeter 9 and the colorimetric value indicated by the colorimetric value information E1.

Thereafter, the second information processing apparatus 7 executes processing in step S112.

Step S112: When the second operation receiving unit 75 receives operation, the color adjusting unit 74 changes the media profile. The operation is performed when the producer determines that it is necessary to adjust a color of the print on which the second printing data C1 is printed.

Thereafter, processing in step S113 is performed.

Step S113: The producer delivers the print on which the second printing data C1 is printed by the second printer 8 to the client.

Then, the printing system 1 ends the printing method.

Any one or more of steps S109, S111, and S112 may be omitted from the printing processing.

When the processing in step S109 is omitted, the display apparatus 3 may be omitted from the configuration of the printing system 1. When the third printer 10 is omitted from the configuration of the printing system 1 or a second printing system 1a, the third printer driver PD3 may be omitted from the configuration of the second information processing apparatus 7.

Figure 9:
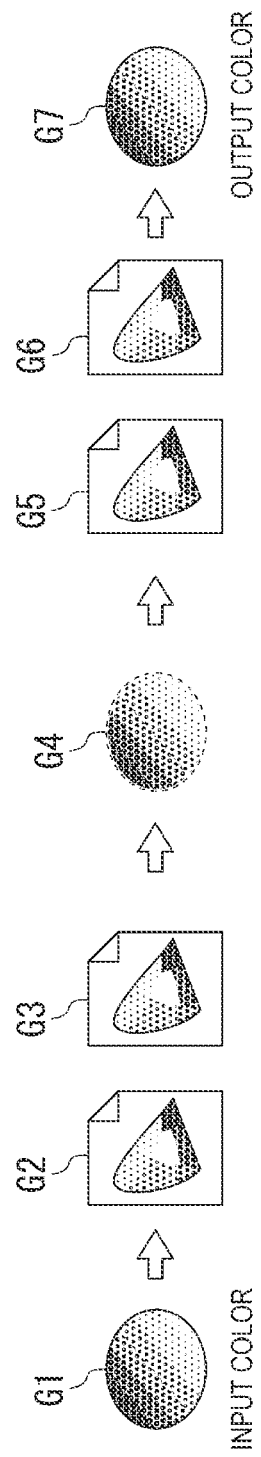
FIG. 9 is a diagram showing an example of color conversion processing according to the first embodiment of the present disclosure.

Color conversion processing based on the second printer information A1 by the first printer driver PD1 is explained with reference to FIG. 9. FIG. 9 is a diagram showing an example of color conversion processing according to this embodiment.

An input color G1 is a color indicated by an input value of a color included in printing data. As explained above, in this embodiment, the input value is an Lab value. An input profile G2 is, for example, a color profile for converting a color gamut of an input value of a color represented by an Lab value into a predetermined color gamut represented by a Lab value. A printing application media profile G6 is a media profile for converting an input value of a color represented by an Lab value into an output value represented by a CMYK value.

When the first printer driver PD1 causes the first printer 4 to execute printing without using the second printer information A1, after the Lab value of the input color G1 is converted by the input profile G2, the converted Lab value is converted by the printing application media profile G6 into an output value represented by a CMYK value.

As explained above, the first printer driver PD1 causes the first printer 4 to simulate, based on the second printer information A1, printing to be executed by the second printer 8. In that case, the first printer driver PD1 uses a mass-production machine first media profile G3 and a mass-production machine second media profile G5 for the conversion of the input color G1 into an output value together with the input profile G2 and the printing application media profile G6.

The mass-production machine first media profile G3 is a media profile for converting an input value of a color represented by an Lab value into an output value represented by a CMYK value.

The input color G1 is converted by the mass-production machine first media profile G3 after being converted by the input profile G2, whereby a simulation CMYK value G4 is generated. The simulation CMYK value G4 is a CMYK value obtained by reproducing a CMYK value used for printing by the second printer 8.

The mass-production machine second media profile G5 is a media profile for converting an input value represented by a CMYK value into an output value represented by an Lab value. After being converted into an Lab value by the mass-production machine second media profile G5, the simulation CMYK value G4 is converted by the printing application media profile G6 into an output value G7 that is an output value represented by the CMYK value. The output value G7 is a CMYK value used for printing by the first printer 4 when printing to be executed by the second printer 8 is simulated.

The mass-production machine first media profile G3 and the mass-production machine second media profile G5 are included in the first color conversion setting information A10.

In the process of the proof work, the mass-production machine first media profile G3 and the mass-production machine second media profile G5 are sometimes changed by adjusting a CMYK value. As explained above, the designer performs the proof work in this embodiment while checking the print printed based on the second printer information A1 for simulating the printing by the second printer 8. The mass-production machine first media profile G3 after the proof work is completed can be directly used as a media profile used for printing of the second printer 8. The mass-production machine first media profile G3 after the proof work is completed is an example of second color conversion setting information D10 included in the color information D1.

Subsequently, a second embodiment of the present disclosure is explained.

In the first embodiment, a model of the second printer used for mass production is determined in advance. In the second embodiment, a model of the second printer used for mass production is not determined in advance. The same components as the components in the first embodiment are denoted by the same reference numerals and signs and explanation of the same components and the same operations is sometimes omitted.

A printing system according to this embodiment is referred to as second printing system 1a. The second printing system 1a according to this embodiment and the printing system 1 according to the first embodiment are different in that the second printing system 1a includes a 1A-th information processing apparatus 2a instead of the first information processing apparatus 2.

Figure 10:
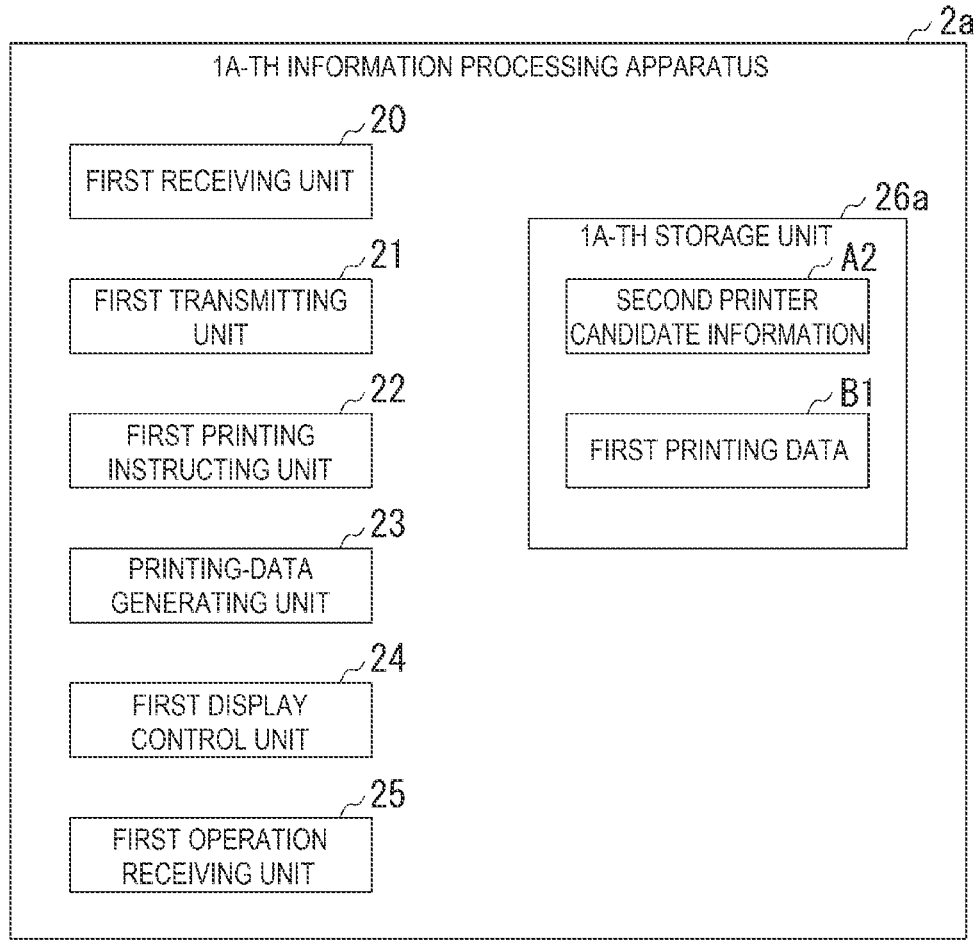
FIG. 10 is a diagram showing an example of a functional configuration of a 1A-th information processing apparatus according to a second embodiment of the present disclosure.

FIG. 10 is a diagram showing an example of a functional configuration of the 1A-th information processing apparatus 2a according to this embodiment. The 1A-th information processing apparatus 2a includes the first receiving unit 20, the first transmitting unit 21, the first printing instructing unit 22, the printing-data generating unit 23, the first display control unit 24, the first operation receiving unit 25, and a 1A-th storage unit 26a. When the 1A-th information processing apparatus 2a according to this embodiment and the first information processing apparatus 2 according to the first embodiment are compared, the 1A-th information processing apparatus 2a is different in that the 1A-th information processing apparatus 2a includes the 1A-th storage unit 26a.

The 1A-th storage unit 26a stores second printer candidate information A2, the first printing data B1, and the like. The second printer candidate information A2 is a candidate of printing setting information assumed to be used in a candidate of the second printer.

Figure 11:
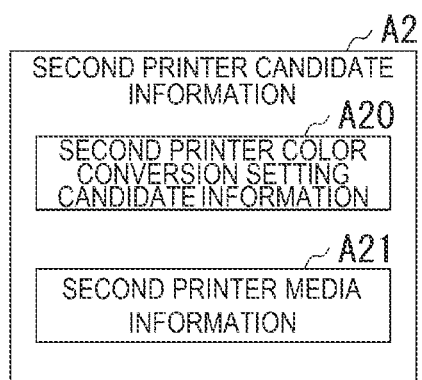
FIG. 11 is a diagram showing an example of a configuration of second printer candidate information according to the second embodiment of the present disclosure.

The second printer candidate information A2 is explained with reference to FIG. 11. FIG. 11 is a diagram showing an example of a configuration of the second printer candidate information A2 according to this embodiment. The second printer candidate information A2 includes second printer color conversion setting candidate information A20 and second printer media information A21.

The second printer color conversion setting candidate information A20 includes candidates of color conversion setting information used for printing by the second printer. The candidates of the color conversion setting information include a candidate of a media profile and candidates of various parameters for printing. That is, the candidates of the color conversion setting information include a candidate of a color profile used for printing by the second printer.

The second printer media information A21 includes candidates of media information used for printing by the second printer.

The second printer color conversion setting candidate information A20 may be omitted from the configuration of the second printer candidate information A2. When the second printer color conversion setting candidate information A20 is omitted from the configuration of the second printer candidate information A2, a predetermined media profile is used as the media profile in the 1A-th information processing apparatus 2a. In that case, the predetermined media profile is stored in advance in the 1A-th storage unit 26a.

Figure 12:
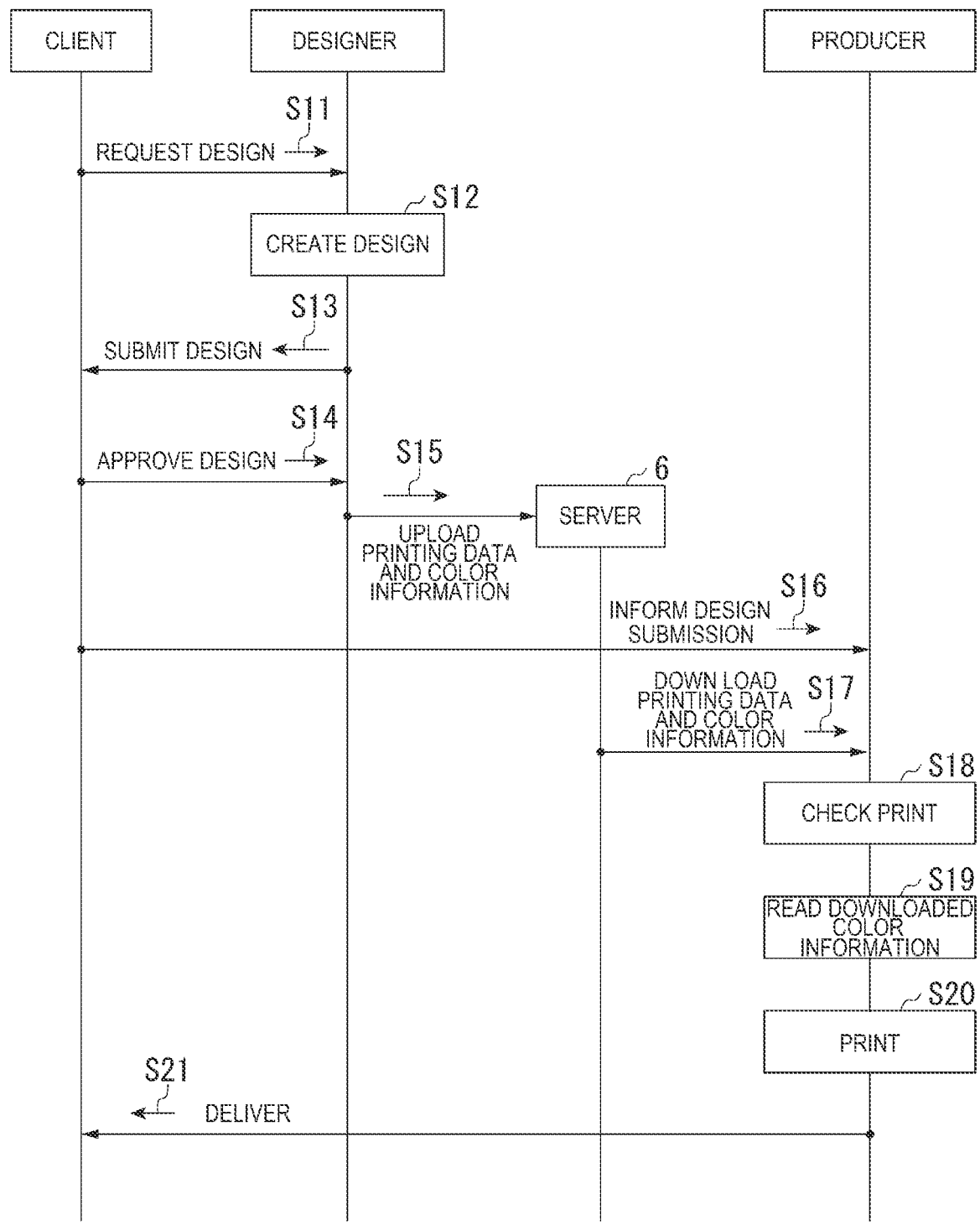
FIG. 12 is a diagram showing an example of an overview of a printing method according to the second embodiment of the present disclosure.

Subsequently, an overview of a printing method including proof work in the second printing system 1a is explained with reference to FIG. 12. FIG. 12 is a diagram showing an example of the overview of the printing method according to this embodiment. In this embodiment, a producer is not determined in a period when a client requests design to a designer. Therefore, a model of a second printer used for mass-production of prints is not determined in advance.

In this embodiment, even when a model of the second printer is determined in advance, at least the designer cannot learn the model of the second printer in some cases. In the following explanation, the model of the second printer not being determined includes a case in which the designer cannot learn the model of the second printer.

Step S11: The client requests design to the designer. In the design requested by the client, one or more of at least a color and a medium are requested.

Step S12: The designer creates design. When creating the design, the designer performs proof work using the first information processing apparatus 2. The first information processing apparatus 2 causes the first printer 4 to execute, based on the second printer candidate information A2 downloaded from the server 6, printing to reproduce a color to be printed by a candidate of the second printer. The designer performs the proof work while checking a print on which a color assumed to be printed by the candidate of the second printer is reproduced.

Respective kinds of processing in steps S17 to S21 are the same as the respective kinds of processing in steps S6 to S10 in FIG. 6. Therefore, explanation of the respective kinds of processing is omitted.

Step S13: The designer informs the client of design submission.

Step S14: The client checks and approves the submitted design.

Step S15: The designer uploads the second printing data C1 and the color information D1 to the server 6.

Step S16: The client informs the producer of the design submission.

Step S17: The producer downloads the second printing data C1 and the color information D1 from the server 6.

Then, the second printing system 1a ends the printing method.

After the print is delivered from the producer to the client in step S21, the client sometimes requests correction of the delivered print. When the correction is requested, the same printing method as the printing method in the first embodiment explained above may be executed. In the second embodiment, at a point in time when the design is requested, a model of the second printer used for mass production of prints is not determined in advance. However, after the printing method shown in FIG. 12 is performed once, since the producer and the model of the second printer are determined, the same printing method as the printing method in the first embodiment can be executed.

Figure 13:
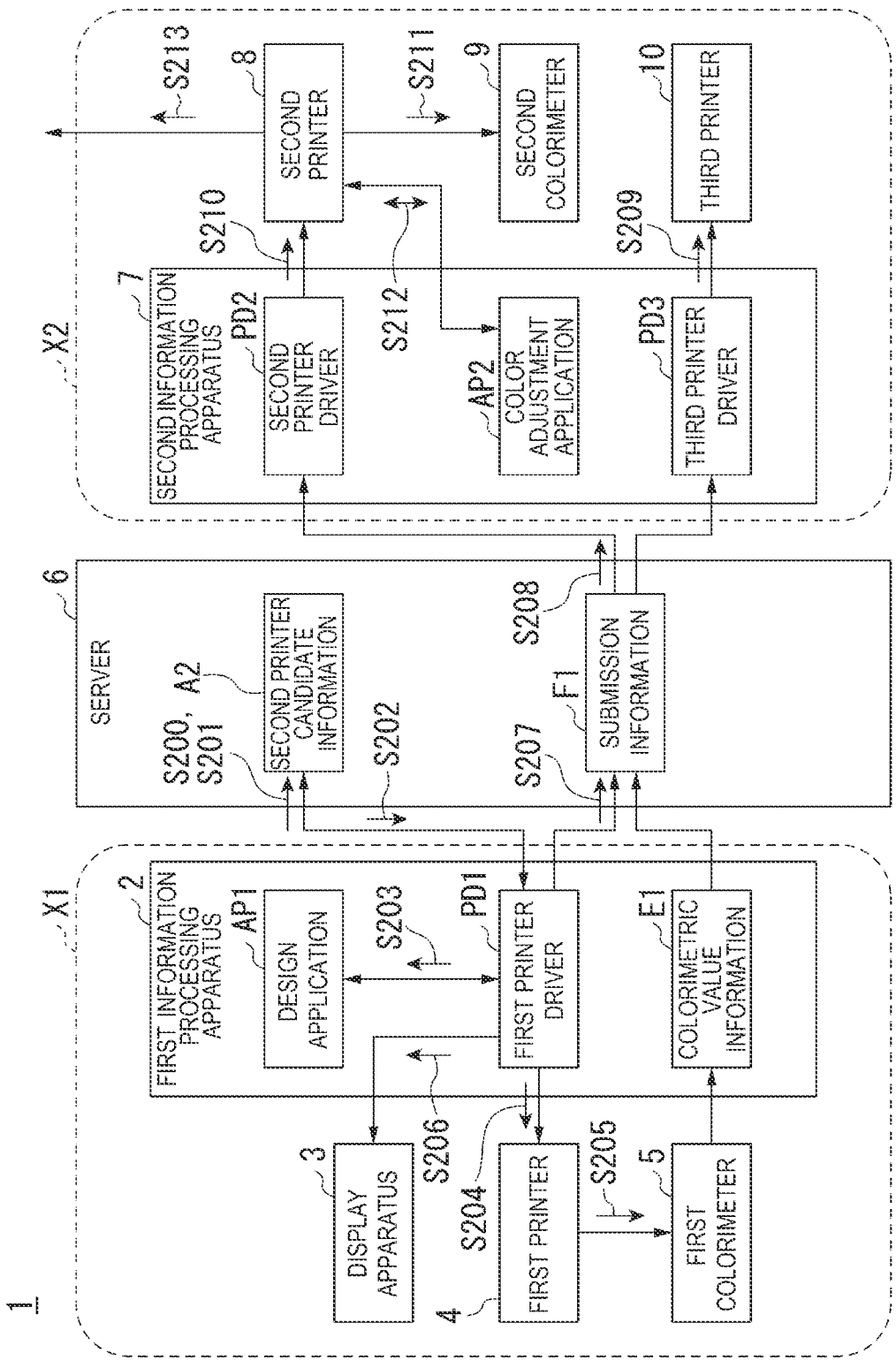
FIG. 13 is a diagram showing an example of details of the printing method according to the second embodiment of the present disclosure.

Subsequently, the printing method in the second printing system 1a is explained in detail with reference to FIG. 13. FIG. 13 is a diagram showing an example of details of the printing method according to this embodiment.

Respective kinds of processing in steps S203 and S205 to S213 are the same as the respective kinds of processing in steps S103 and S105 to S113 in FIG. 7. Therefore, explanation of the respective kinds of processing is omitted.

Step S200: The first transmitting unit 21 transmits design request information to the server 6. The design request information indicates a request from the client about one or more of at least a color and a medium. The designer inputs the request from the client from the first operation receiving unit 25. The first transmitting unit 21 transmits the design request information to the server 6 based on the input request.

Thereafter, the server 6 executes processing in step S201.

Step S201: The server 6 receives the design request information from the 1A-th information processing apparatus 2a. The server 6 stores a plurality of kinds of second printer candidate information in advance. The server 6 selects, out of the plurality of kinds of second printer candidate information, the second printer candidate information A2 corresponding to the received design request information.

For example, the server 6 selects second printer candidate information including second printer media information indicating a medium matching a medium indicated by the design request information. For example, the server 6 selects second printer candidate information including second printer color conversion setting candidate information including a color gamut suitable for a color indicated by the design request information.

The server 6 transmits the selected second printer candidate information A2 to the 1A-th information processing apparatus 2a.

Thereafter, the 1A-th information processing apparatus 2a executes processing in step S202.

Step S202: The first receiving unit 20 receives the second printer candidate information A2 from the server 6. That is, the first receiving unit 20 receives first printing setting information including the second printer media information A21 and the second printer color conversion setting candidate information A20. Therefore, the first receiving unit 20 receives first printing setting information including at least the second printer media information A21 used for printing by the second printer 8 and a candidate of a color profile used for the printing by the second printer 8.

The first receiving unit 20 causes the 1A-th storage unit 26a to store the received second printer candidate information A2. The first printer driver PD1 reads the second printer candidate information A2 from the 1A-th storage unit 26a.

Thereafter, the 1A-th information processing apparatus 2a executes processing in step S203.

Step S204: The first printing instructing unit 22 instructs the first printer 4 to print the first printing data B1 based on the second printer candidate information A2 received by the first receiving unit 20. The first printing instructing unit 22 causes the first printer 4 to simulate printing assumed to be executed by a candidate of the second printer 8 and execute printing of the first printing data B1 based on the second printer candidate information A2.

Thereafter, the 1A-th information processing apparatus 2a executes processing in step S205.

When the correction is requested after the delivery to the client as explained above, the same printing method as the printing method in the first embodiment explained above may be executed. That is, the printing system may subsequently execute the printing method shown in FIG. 7 after executing the printing method shown in FIG. 13.

In this embodiment, an example is explained in which the first printing setting information includes the second printer color conversion setting candidate information A20 and the second printer media information A21. However, not only this, but, as explained above, the first printing setting information only has to include at least the second printer media information A21 and may not include the second printer color conversion setting candidate information A20. In that case, in step S204, the first receiving unit 20 receives first printing setting information including at least the second printer media information A21 used for printing by the second printer 8. This is because, as explained above, when a model of the second printer 8 is not determined in advance, one or more of at least a color and a medium are requested when the client requests design.

The server 6 stores one or more of the second printer media information A21 used for printing by the second printer 8 and a candidate of a color profile used for the printing by the second printer 8.

In the embodiments explained above, an example is explained in which the first information processing apparatus 2 and the first printer 4 are the separate apparatuses.

However, not only this, but the first information processing apparatus 2 and the first printer 4 may be included in the printing system as an integral apparatus. The apparatus is, for example, a proofer including the functions of the first information processing apparatus 2.

In the embodiments explained above, an example is explained in which the second information processing apparatus 7 and the second printer 8 are the separate apparatuses. However, not only this, but the second information processing apparatus 7 and the second printer 8 may be included in the printing system as an integral apparatus. The apparatus is, for example, a mass-production machine including the functions of the second information processing apparatus 7.

Subsequently, an example of a user interface used in the printing system 1 or the second printing system 1a is explained with reference to FIGS. 14 to 19. The first information processing apparatus 2 or the 1A-th information processing apparatus 2a causes the display apparatus 3 to display the user interface. In the following explanation, as an example, a user interface that the first information processing apparatus 2 causes the display apparatus 3 to display is explained.

Figure 14:
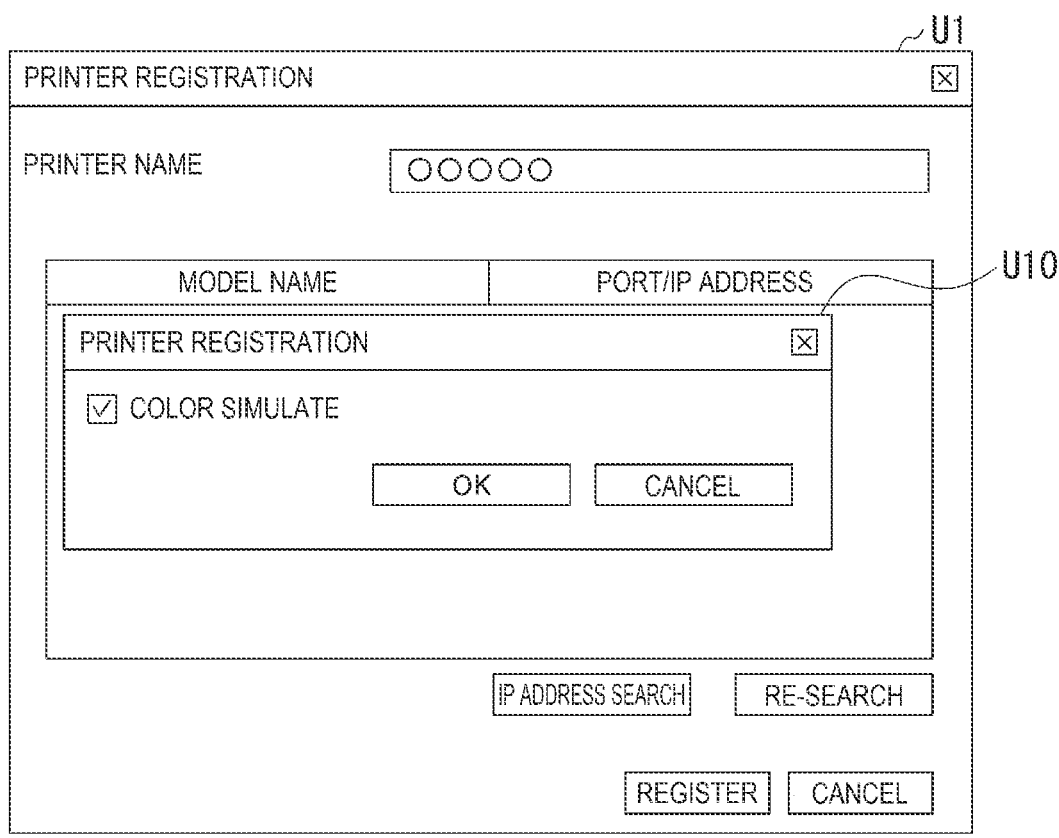
FIG. 14 is a diagram showing an example of a screen for selecting a proof mode according to the embodiments of the present disclosure.

FIG. 14 is a diagram showing an example of a screen for selecting a proof mode according to this embodiment. A mode selection screen U1 is an example of the screen. Modes of processing performed by the first information processing apparatus 2 include a proof mode and a normal mode. The proof mode is a mode for causing the first printer 4 to operate as a proofer. The normal mode is a mode for causing the first printer 4 to operate as a normal printer.

A mode selection popup U10 is displayed on the mode selection screen U1. When an item indicated by text "color simulate" is selected in the mode selection popup U10, the proof mode is selected. When the item is not selected, the normal mode is selected.

The first operation receiving unit 25 receives operation for selecting the proof mode or the normal mode. When the proof mode is selected in the operation for selecting the proof mode or the normal mode, the first display control unit 24 generates a proof dedicated screen for receiving operation for the proof mode.

FIG. 15 is a diagram showing an example of a proof mode dedicated screen according to this embodiment. A first simulation profile setting item U20 is displayed on a first color setting screen U2 as a proof mode dedicated setting item. The first simulation profile setting item U20 is not displayed in the normal mode.

One or more of a media profile and a device link profile used in the second printer 8 can be selected from the first simulation profile setting item U20. The selected one or more of the media profile and the device link profile are used for color conversion as a profile for simulating the second printer 8 when the first printer 4 executes printing. The color conversion means converting an input value included in printing data into an output value.

In the embodiment explained above, an example is explained in which the colorimetric patch is printed together with the first printing data B1. Whether to print the colorimetric patch is selected by the designer from the proof mode dedicated setting item.

FIG. 16 is a diagram showing an example of a proof mode dedicated setting item including an item for selecting printing of a colorimetric patch according to this embodiment. A second simulation profile setting item U30 is displayed on a second color setting screen U3 as the proof mode dedicated setting item.

The second simulation profile setting item U30 includes a patch printing setting item U31. Whether to print the colorimetric patch can be selected from the patch printing setting item U31. In the patch printing setting item U31, it is possible to select whether to print the colorimetric patch and set details about the colorimetric patch.

The first operation receiving unit 25 receives operation for designating whether to cause the first printer 4 to print the colorimetric patch when the first printer 4 executes printing of the first printing data B1. The patch printing setting item U31 is a setting item for performing the operation.

When it is designated to cause the first printer 4 to print the colorimetric patch, the first printer 4 prints the colorimetric patch together with the first printing data B1. When it is designated not to cause the first printer 4 to print the colorimetric patch, the first printer 4 does not print the colorimetric patch.

Figure 17:
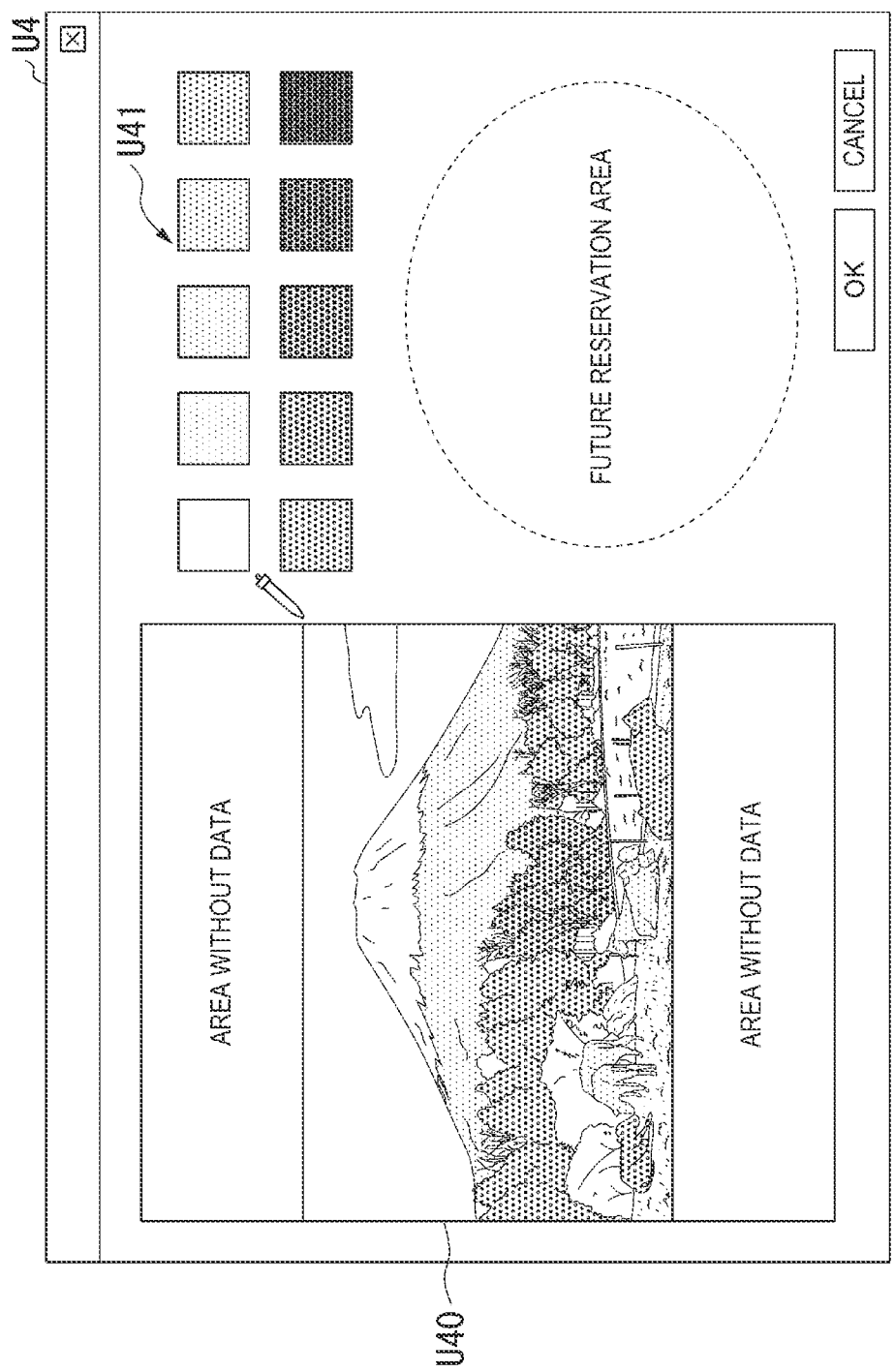
FIG. 17 is a diagram showing an example of a screen for setting details about the colorimetric patch according to the embodiments of the present disclosure.

FIG. 17 is a diagram showing an example of a screen for setting details about the colorimetric patch according to this embodiment. A patch setting screen U4 includes a first preview U40 and a colorimetric patch candidate U41. The first preview U40 is a preview of a print based on the first printing data B1. The colorimetric patch candidate U41 indicates candidates of the colorimetric patch. Colors used for the colorimetric patch can be selected from colors of pixels included in the first preview U40. The pixels are selected from the first preview U40 using a mouse pointer by operation of the designer.

When a colorimetric patch is selected, a print on which the selected colorimetric patch is printed together with the first printing data B1 can be checked from a preview screen.

Figure 18:
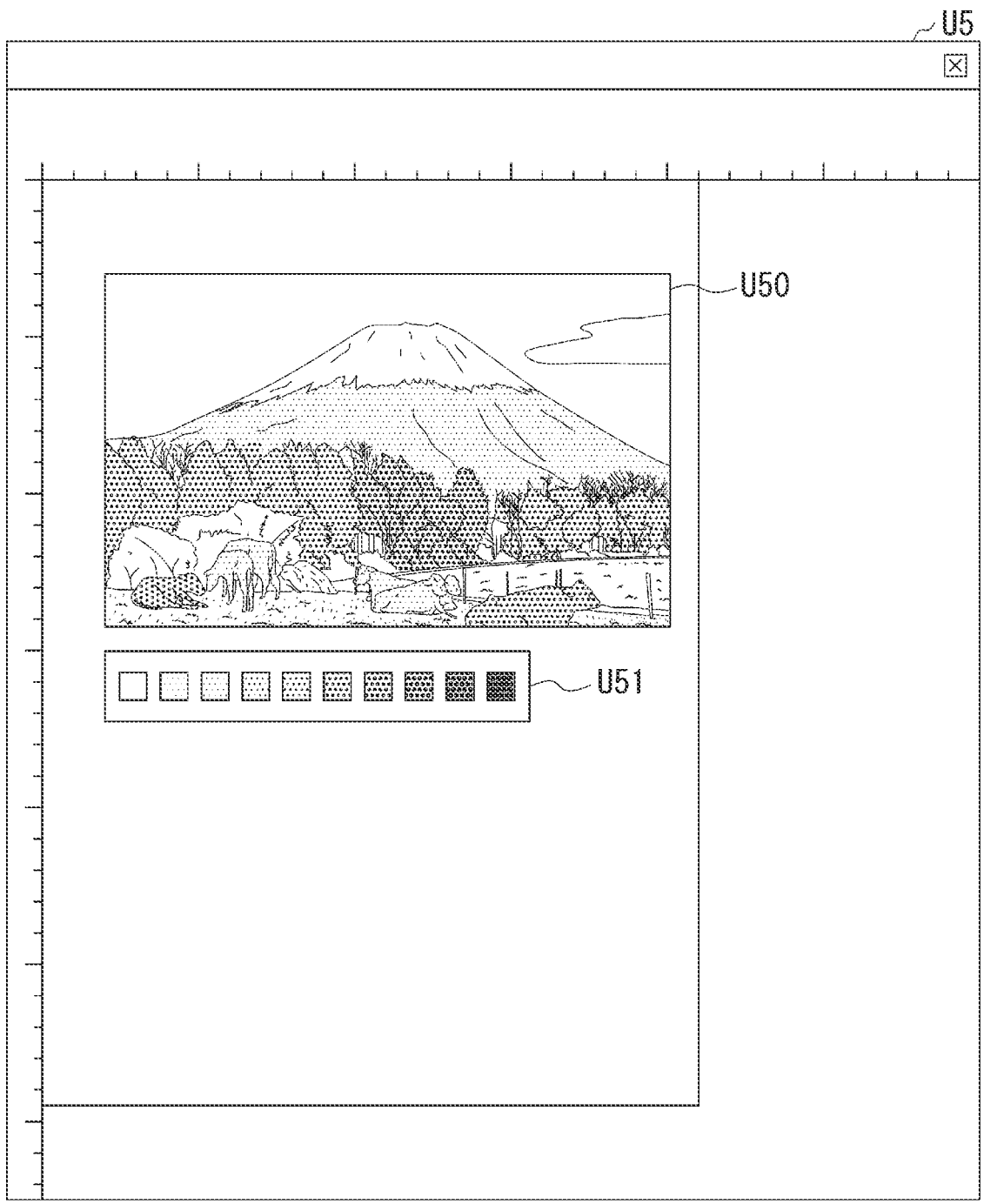
FIG. 18 is a diagram showing an example of a preview screen for checking a print in the case in which the colorimetric patch is printed together with first printing data according to the embodiments of the present disclosure.

FIG. 18 is a diagram showing an example of a preview screen for checking a print on which the colorimetric patch is printed together with the first printing data B1 according to this embodiment. A first preview screen U5 includes a second preview U50 and a colorimetric patch preview U51. The second preview U50 is a preview of a print based on the first printing data B1. The colorimetric patch preview U51 is a preview of the colorimetric patch to be printed.

As explained above, colorimetry is performed for the printed colorimetric patch by the first colorimeter 5. A colorimetric result by the first colorimeter 5 can be shared as the colorimetric value information E1 between the designer and the producer via the server 6. The producer can use the colorimetric value information E1 acquired from the server 6 for inspection work for a print.

The first information processing apparatus 2 displays, side by side, a color value of printing data to be printed by the first printer 4 and a color value of printing data to be printed by the second printer 8.

Figure 19:
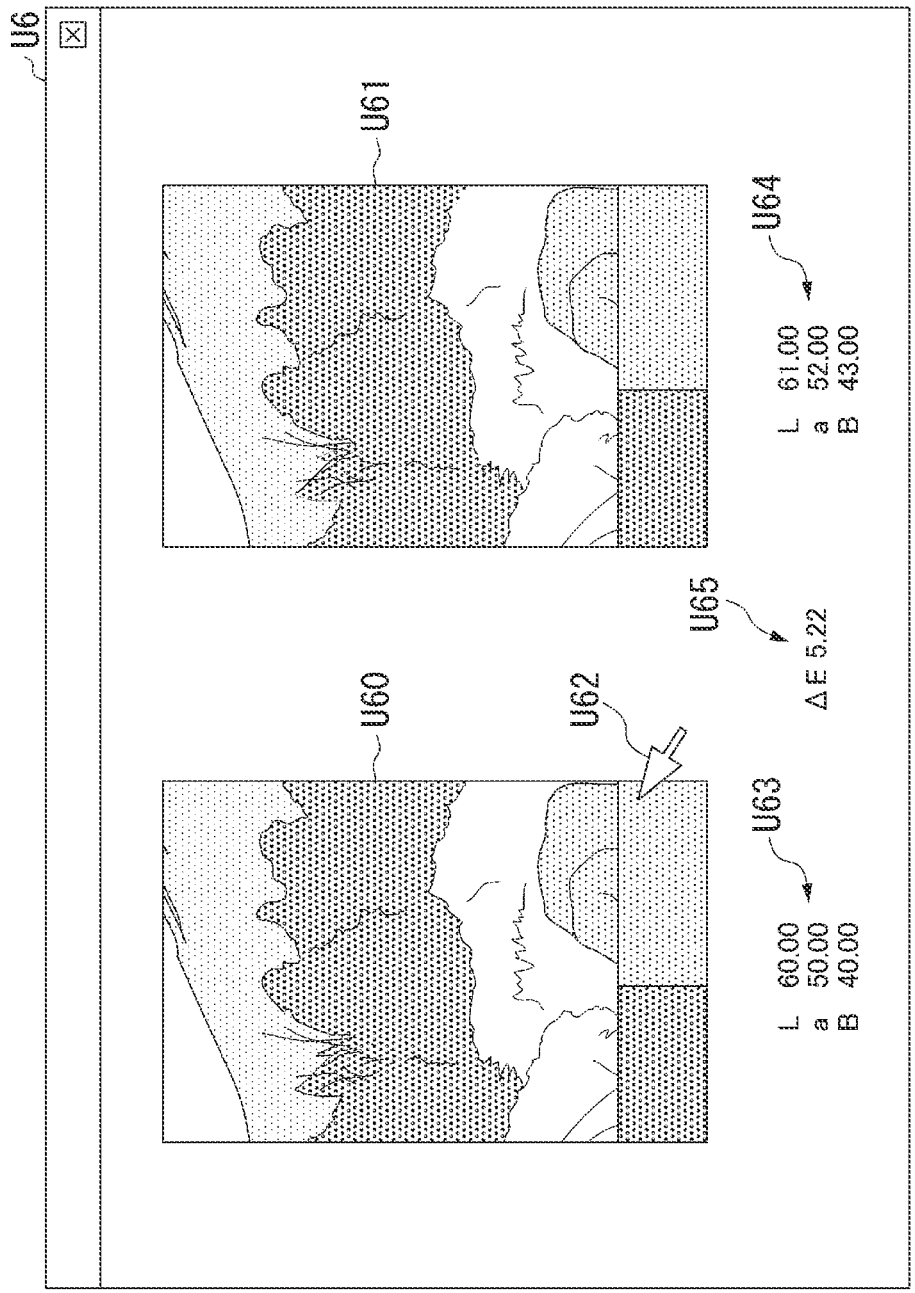
FIG. 19 is a diagram showing an example of a screen on which a color value of printing data printed by a first printer and a color value of printing data printed by a second printer are displayed side by side according to the embodiments of the present disclosure.

FIG. 19 is a diagram showing an example of a screen on which a color value of printing data to be printed by the first printer 4 and a color value of printing data to be printed by the second printer 8 are displayed side by side according to this embodiment. A second preview screen U6 includes a mass-production machine preview U60, a proofer preview U61, a mass-production machine Lab value U63, a proofer Lab value U64, and a color difference U65.

The mass-production machine preview U60 is a preview of the second printing data C1 to be printed by the second printer 8. The proofer preview U6*l* is a preview of printing data to be printed by the first printer 4. The printing data to be printed by the first printer 4 is the first printing data B1 or the second printing data C1.

The proofer Lab value U64 is a color value for a designated first pixel among pixels included in the proofer preview U61. The designated first pixel is a pixel selected by a mouse pointer U62.

The mass-production machine Lab value U63 is a color value for a second pixel corresponding to the first pixel among pixels included in the mass-production machine preview U60. Pixels corresponding to each other means that positions in a preview are the same. The positions being the same means that, for example, values of two-dimensional coordinates are the same. A value of a two-dimensional coordinate of the first pixel in the mass-production machine preview U60 and a value of a two-dimensional coordinate in the proofer preview U6l of the second pixel corresponding to the first pixel are the same.

The color difference U65 is a difference between the proofer Lab value U64 and the mass-production machine Lab value U63. The color difference U65 may be an absolute value of the difference. On the second preview screen U6, as an example, the color difference U65 is displayed using a numerical value.

The color difference U65 may be displayed in a form in which light and shade such as a gray scale is given to a predetermined region. In that case, for example, the region is displayed darker as the color difference U65 is larger and is displayed thinner as the color difference U65 is smaller.

The color difference U65 may be displayed using both of the form in which light and shade such as a gray scale is given to the predetermined region and a numerical value.

The first printing instructing unit 22 generates the second preview screen U6 via the first display control unit 24. The first printing instructing unit 22 displays the color difference U65 on the second preview screen U6.

The designer can perform proof work while checking the second preview screen U6. The designer can perform the proof work referring to the color difference U65 based on a pixel of attention.

As explained above, the printing method according to this embodiment includes a first printing setting information receiving step, a first printing instructing step, a first printing step, a transmitting step, a receiving step, a second printing setting information receiving step, a second printing instructing step, and a second printing step.

In the first printing setting information receiving step, a first information processing unit receives, from the first information supplying unit, first printing setting information for simulating printing to be executed by a second printing unit.

In the first printing instructing step, the first information processing unit instructs a first printing unit different from the second printing unit to print the first printing data B1 based on the first printing setting information received in the first printing setting information receiving step.

In the first printing step, the first printing unit executes, according to the instruction from the first information processing unit in the first printing instructing step, the printing of the first printing data B1 based on the first printing setting information.

In the transmitting step, the first information processing unit transmits, to a second information supplying unit, the second printing data C1 based on the first printing data B1 used for the execution of the printing by the first printing unit in the first printing step and second printing setting information based on a colorimetric result concerning the first printing data B1.

In the receiving step, the second information supplying unit receives, from the first information processing unit, the second printing data C1 and the second printing setting information transmitted in the transmitting step.

In the second printing setting information receiving step, a second information processing unit receives, from the second information supplying unit, the second printing data C1 and the second printing setting information received in the receiving step.

In the second printing instructing step, the second information processing unit instructs the second printing unit to print the second printing data C1 based on the second printing setting information received in the second printing setting information receiving step.

In the second printing step, the second printing unit executes, according to the instruction from the second information processing unit in the second printing instructing step, the printing of the second printing data C1 based on the second printing setting information received in the second printing setting information receiving step.

In this embodiment, step S102 is an example of the first printing setting information receiving step. Step S104 is an example of the first printing instructing step and the first printing step. Step S107 is an example of the transmitting step and the receiving step. Step S108 is an example of the second printing setting information receiving step. Step S110 is an example of the second printing instructing step. Step S110 is an example of the second printing step.

In this embodiment, the first information processing apparatus 2 is an example of the first information processing unit. The first printer 4 is an example of the first printing unit. The second information processing apparatus 7 is an example of the second information processing unit. The second printer 8 is an example of the second printing unit. The server 6 is an example of the first information supplying unit and the second information supplying unit. As explained above, in an example of this embodiment, the first information supplying unit and the second information supplying unit are included as a virtual server.

The second printer information A1 according to the first embodiment or the second printer color conversion setting candidate information A20 according to the second embodiment is an example of the first printing setting information. The color information D1 is an example of the second printing setting information.

With this configuration, in the printing method according to this embodiment, the printing to be executed by the second printing unit can be simulated by the first printing unit based on the first printing setting information received from the first information supplying unit. Therefore, it is possible to improve efficiency of the proof work.

In the printing method according to this embodiment, a color profile for converting an input value of a color into an output value is included in at least one of the first printing setting information and the second printing setting information.

In this embodiment, the first color conversion setting information A10 and the second color conversion setting information D10 are examples of the color profile.

With this configuration, in the printing method according to this embodiment, the printing of the second printing unit can be simulated using the color profile. Therefore, it is possible to improve the efficiency of the proof work compared when the color profile is not included in at least one of the first printing setting information and the second printing setting information.

In the printing method according to this embodiment, in the first printing setting information receiving step, the first information processing unit receives first printing setting information including printing setting information used for printing by the second printing unit.

The second printer information A1 according to the first embodiment is an example of the printing setting information used for the printing by the second printing unit.

With this configuration, in the printing method according to this embodiment, the printing to be executed by the second printing unit can be simulated by the first printing unit based on the printing setting information used for the printing by the second printing unit. Therefore, it is possible to improve the efficiency of the proof work when the second printing unit is determined in advance.

In the printing method according to this embodiment, in the first printing setting information receiving step, the first information processing unit receives first printing setting information including at least printing media information used for the printing by the second printing unit.

The second printer media information A21 according to the second embodiment is an example of the printing media information used for the printing by the second printing unit.

With this configuration, in the printing method according to this embodiment, the printing to be executed by the second printing unit can be simulated by the first printing unit based on the printing media information used for the printing by the second printing unit. Therefore, it is possible to improve the efficiency of the proof work when the second printing unit is not determined in advance and a type and the like of a printing medium are determined in advance.

In the printing method according to this embodiment, in the first printing setting information receiving step, the first information processing unit receives first printing setting information including at least the printing media information used for the printing by the second printing unit and a candidate of a color profile used for the printing by the second printing unit.

The second printer color conversion setting candidate information A20 according to the second embodiment is an example of the first printing setting information.

With this configuration, in the printing method according to this embodiment, the printing to be executed by the second printing unit can be simulated by the first printing unit based on the printing media information used for the printing by the second printing unit and the candidate of the color profile used for the printing by the second printing unit. Therefore, it is possible to improve the efficiency of the proof work when the second printing unit is not determined in advance and a type of a printing medium and a candidate of a color profile are determined in advance.

In the printing method according to this embodiment, modes of processing performed by the first information processing unit include a proof mode and a normal mode. The printing method further includes a mode selection receiving step and a proof dedicated screen generating step.

In the mode selection receiving step, the first information processing unit receives operation for selecting the proof mode or the normal mode.

In the proof dedicated screen generating step, when the proof mode is selected in the operation received in the mode selection receiving step, the first information processing unit generates a proof dedicated screen for receiving operation for the proof mode.

With this configuration, in the printing method according to this embodiment, a proof dedicated screen can be generated when the proof mode is selected. Therefore, it is possible to improve operability of a user in the proof work. The user is a designer.

In the printing method according to this embodiment, in the first printing step, the first printing unit prints a colorimetric patch together with the first printing data B1. In the transmitting step, the first information processing unit transmits, to the second information supplying unit, the second printing data C1 and second printing setting information based on a result of performing colorimetry for the colorimetric patch printed in the first printing step.

With this configuration, in the printing method according to this embodiment, the proof work can be performed based on the result of performing the colorimetry for the colorimetric patch. Therefore, it is possible to improve efficiency of the proof work compared with when the proof work is not based on the result of performing the colorimetry for the colorimetric patch.

The printing method according to this embodiment further includes a colorimetric patch printing selecting step.

In the colorimetric patch printing selecting step, the first information processing unit receives operation for designating whether to cause the first printing unit to print the colorimetric patch in the first printing step.

In the first printing step, when it is designated in the colorimetric patch printing selecting step to cause the first printing unit to print the colorimetric patch, the first printing unit prints the colorimetric patch together with the first printing data B1 and, when it is designated in the colorimetric patch printing selecting step not to cause the first printing unit to print the colorimetric patch, the first printing unit does not print the colorimetric patch.

With this configuration, in the printing method according to this embodiment, the colorimetric patch can be printed only when it is necessary to check the colorimetric patch. Therefore, it is possible to improve the operability of the user in the proof work compared with when it cannot be selected whether to print the colorimetric patch.

The printing method according to this embodiment further includes a preview screen generating step.

In the preview screen generating step, the first information processing unit generates a preview screen that is a screen including a first preview that is a preview of the first printing data B1 printed by the first printing unit, a first color value that is a color value for a designated first pixel among pixels included in the first preview, a second preview that is a preview of the second printing data C1 printed by the second printing unit, and a second color value that is a color value for a second pixel corresponding to the first pixel among pixels included in the second preview.

With this configuration, in the printing method according to this embodiment, the first preview, the second preview, the first color value, and the second color value can be checked. Therefore, it is possible to improve the efficiency of the proof work compared with when the first color value and the second color value are not checked.

In the printing method according to this embodiment, in the preview screen generating step, the first information processing unit displays, on the preview screen, a color difference that is a difference between the first color value and the second color value.

With this configuration, in the printing method according to this embodiment, the color difference between the first color value and the second color value can be checked. Therefore, it is possible to improve the efficiency of the proof work compared with when the color difference is not checked.

A part of the first information processing apparatus 2, the 1A-th information processing apparatus 2a, or the second information processing apparatus 7 in the embodiments explained above, for example, the first receiving unit 20, the first transmitting unit 21, the first printing instructing unit 22, the printing-data generating unit 23, the first display control unit 24, the first operation receiving unit 25, the second receiving unit 70, the second transmitting unit 71, the second printing instructing unit 72, the third printing instructing unit 73, the color adjusting unit 74, and the second operation receiving unit 75 may be realized by a computer. In that case, these units may be realized by recording a program for realizing a function of controlling the units in a computer-readable recording medium, causing a computer system to read the program recorded in the recording medium, and executing the program. The "computer system" referred to herein is a computer system incorporated in the first information processing apparatus 2, the 1A-th information processing apparatus 2a, or the second information processing apparatus 7 and includes an OS and hardware such as peripheral equipment. The "computer-readable recording medium" means a portable medium such as a flexible disk, a magneto-optical disk, a ROM, or a CD-ROM or a storage device such as a hard disk incorporated in the computer system. Further, the "computer-readable recording medium" may include a recording medium that dynamically stores a program for a short time like a communication line at the time when the program is transmitted via a network such as the Internet or a communication line such as a telephone line or a recording medium that stores a program for a fixed time like a volatile memory inside the computer system functioning as a server or a client when the program is transmitted. The program may be a program for realizing a part of the functions explained above or may be a program that can realize the functions in combination with a program already recorded in the computer system.

A part or the entirety of the first information processing apparatus 2, the 1A-th information processing apparatus 2a, or the second information processing apparatus 7 may be realized as an integrated circuit such as an LSI (Large Scale Integration). The functional blocks of the first information processing apparatus 2, the 1A-th information processing apparatus 2a, or the second information processing apparatus 7 may be individually converted into processors or a part or all of the functional blocks may be integrated and converted into a processor. A method of conversion into an integrated circuit is not limited to the LSI and may be realized by a dedicated circuit or a general-purpose processor. When a technology for conversion into an integrated circuit substituting the LSI appears according to progress of a semiconductor technology, an integrate circuit by the technology may be used.

The embodiments of the present disclosure are explained in detail above with reference to the drawings. However, a specific configuration is not limited to the configuration explained above. Various design changes and the like can be made without departing from the gist of the present disclosure.

What is claimed is:

1. A printing method comprising:
   a first printing setting information receiving step in which a first information processing unit receives, from a first information supplying unit, first printing setting information for simulating printing to be executed by a second printing unit;
   a first printing instructing step in which the first information processing unit instructs a first printing unit different from the second printing unit to print first printing data based on the first printing setting information received in the first printing setting information receiving step;
   a first printing step in which the first printing unit executes, according to the instruction from the first information processing unit in the first printing instructing step, the printing of the first printing data based on the first printing setting information;
   a transmitting step in which the first information processing unit transmits, to a second information supplying unit, second printing data based on the first printing data used for the execution of the printing by the first printing unit in the first printing step and second printing setting information based on a colorimetric result concerning the first printing data;
   a receiving step in which the second information supplying unit receives, from the first information processing unit, the second printing data and the second printing setting information transmitted in the transmitting step;
   a second printing setting information receiving step in which a second information processing unit receives, from the second information supplying unit, the second printing data and the second printing setting information received in the receiving step;
   a second printing instructing step in which the second information processing unit instructs the second printing unit to print the second printing data based on the second printing setting information received in the second printing setting information receiving step; and
   a second printing step in which the second printing unit executes, according to the instruction from the second information processing unit in the second printing instructing step, the printing of the second printing data based on the second printing setting information.

2. The printing method according to claim 1, wherein a color profile for converting an input value of a color into an output value is included in at least one of the first printing setting information and the second printing setting information.

3. The printing method according to claim 1, wherein, in the first printing setting information receiving step, the first information processing unit receives the first printing setting information including printing setting information used for the printing by the second printing unit.

4. The printing method according to claim 1, wherein, in the first printing setting information receiving step, the first information processing unit receives the first printing setting information including at least printing media information used for the printing by the second printing unit.

5. The printing method according to claim 4, wherein, in the first printing setting information receiving step, the first information processing unit receives the first printing setting information including at least the printing media information used for the printing by the second printing unit and a candidate of a color profile used for the printing by the second printing unit.

6. The printing method according to claim 1, wherein
   modes of processing performed by the first information processing unit include a proof mode and a normal mode, and
   the printing method further comprises:
   a mode selection receiving step in which the first information processing unit receives operation for selecting the proof mode or the normal mode; and
   a proof dedicated screen generating step in which, when the proof mode is selected in the operation received in the mode selection receiving step, the first information processing unit generates a proof dedicated screen for receiving operation for the proof mode.

7. The printing method according to claim 1, wherein
in the first printing step, the first printing unit prints a colorimetric patch together with the first printing data, and
in the transmitting step, the first information processing unit transmits, to the second information supplying unit, the second printing data and the second printing setting information based on a result of performing colorimetry for the colorimetric patch printed in the first printing step.

8. The printing method according to claim 7, further comprising a colorimetric patch printing selecting step in which the first information processing unit receives operation for designating whether to cause the first printing unit to print the colorimetric patch in the first printing step, wherein
in the first printing step, when it is designated in the colorimetric patch printing selecting step to cause the first printing unit to print the colorimetric patch, the first printing unit prints the colorimetric patch together with the first printing data and, when it is designated in the colorimetric patch printing selecting step not to cause the first printing unit to print the colorimetric patch, the first printing unit does not print the colorimetric patch.

9. The printing method according to claim 1, further comprising a preview screen generating step in which the first information processing unit generates a preview screen that is a screen including a first preview that is a preview of the first printing data to be printed by the first printing unit, a first color value that is a color value for a designated first pixel among pixels included in the first preview, a second preview that is a preview of the second printing data to be printed by the second printing unit, and a second color value that is a color value for a second pixel corresponding to the first pixel among pixels included in the second preview.

10. The printing method according to claim 9, wherein, in the preview screen generating step, the first information processing unit displays, on the preview screen, a color difference that is a difference between the first color value and the second color value.

11. A server that:
transmits, to a first information processing unit, first printing setting information for simulating printing to be executed by a second printing unit;
receives, from the first information processing unit, second printing data based on first printing data used for execution of printing by a first printing unit different from the second printing unit according to an instruction to print the first printing data based on the first printing setting information received from the first information processing unit and second printing setting information based on a colorimetric result concerning the first printing data; and
transmits, to a second information processing unit that instructs the second printing unit to print the second printing data based on the second printing setting information, the second printing data and the second printing setting information received from the first information processing unit.

12. The server according to claim 11, wherein the server stores one or more of printing media information used for the printing by the second printing unit and a candidate of a color profile used for the printing by the second printing unit.

13. A printing system comprising:
a first information processing unit;
a first printing unit;
a second information processing unit;
a second printing unit different from the first printing unit;
a first information supplying unit; and
a second information supplying unit, wherein
the first information processing unit includes:
  a first receiving unit configured to receive, from the first information supplying unit, first printing setting information for simulating printing to be executed by the second printing unit;
  a first printing instructing unit configured to instruct the first printing unit to print first printing data based on the first printing setting information received by the first receiving unit; and
  a first transmitting unit configured to transmit, to the second information supplying unit, second printing data based on the first printing data used for the execution of the printing by the first printing unit according to the instruction from the first printing instructing unit and second printing setting information based on a colorimetric result concerning the first printing data,
the first printing unit executes, according to the instruction from the first printing instructing unit, the printing of the first printing data based on the first printing setting information,
the second information supplying unit receives, from the first information processing unit, the second printing data and the second printing setting information transmitted by the first transmitting unit,
the second information processing unit includes:
  a second receiving unit configured to receive, from the second information supplying unit, the second printing data and the second printing setting information received by the second information supplying unit; and
  a second printing instructing unit configured to instruct the second printing unit to print the second printing data based on the second printing setting information received by the second receiving unit, and
the second printing unit executes, according to the instruction from the second printing instructing unit, the printing of the second printing data based on the second printing setting information.

* * * * *